United States Patent
Novik et al.

(10) Patent No.: US 10,853,332 B2
(45) Date of Patent: Dec. 1, 2020

(54) DISCOVERING SCHEMA USING ANCHOR ATTRIBUTES

(71) Applicant: Microsoft Technology Licensing, LLC, Redmond, WA (US)

(72) Inventors: Lev Novik, Bellevue, WA (US); Surajit Chaudhuri, Redmond, WA (US); Yeye He, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 271 days.

(21) Appl. No.: 15/957,378

(22) Filed: Apr. 19, 2018

(65) Prior Publication Data

US 2019/0325046 A1    Oct. 24, 2019

(51) Int. Cl.
*G06F 16/21*    (2019.01)
*G06F 16/22*    (2019.01)

(52) U.S. Cl.
CPC ........ *G06F 16/213* (2019.01); *G06F 16/2282* (2019.01)

(58) Field of Classification Search
None
See application file for complete search history.

(56) References Cited

U.S. PATENT DOCUMENTS

| | | | | |
|---|---|---|---|---|
| 7,752,077 B2 * | 7/2010 | Holden | ................. | G06Q 30/06 705/26.1 |
| 7,831,545 B1 * | 11/2010 | Betz | ..................... | G06F 16/313 707/603 |
| 2006/0253427 A1 * | 11/2006 | Wu | .................... | G06F 16/90324 |
| 2015/0100562 A1 * | 4/2015 | Kohlmeier | ............ | G06F 16/332 707/706 |
| 2017/0132288 A1 * | 5/2017 | Ho | ........................ | G06F 16/313 |
| 2019/0266283 A1 * | 8/2019 | Shukla | .................. | G06F 16/951 |

OTHER PUBLICATIONS

"DBpedia infobox-to-ontology mappings", Retrieved From <<http://mappings.dbpedia.org/index.php/Special: AllPages/Mapping_en>>, Retrieved on: Nov. 3, 2017, 1 page.

"DBpedia SPARQL Benchmark", Retrieved From <<https://web.archive.org/web/20121118033547/http://aksw.org/Projects/DBPSB.html>>, Nov. 18, 2012, 4 Pages.

(Continued)

*Primary Examiner* — Uyen T Le
(74) *Attorney, Agent, or Firm* — Schwegman Lundberg & Woessner, P.A.

(57) ABSTRACT

Systems, methods, and computer-executable instructions for partitioning a data set include receiving anchor attributes of a data set. The data set includes records, with each record including attributes. A set of filter attributes that are not mutually exclusive with any of the anchor attributes is determined. A set of candidate attributes that include each unique attribute from the first data set, excluding the anchor attributes and the filter attributes, is determined. For each of the anchor attributes and the anchor attributes, an attribute context is determined. For each of the candidate attributes, a context similarity between each of the anchor attributes is determined. A new anchor attribute is selected from the set of candidate attributes based on the context similarity.

20 Claims, 15 Drawing Sheets

(56) References Cited

OTHER PUBLICATIONS

"Help:Infobox", Retrieved From <<https://en.wikipedia.org/wiki/Help:Infobox>>, Retrieved on: Nov. 3, 2017, 6 Pages.

"Splunk", Retrieved From <<http://www.splunk.com/>>, Retrieved on: Nov. 3, 2017, 8 Pages.

"Microsoft Azure—SQL Database", Retrieved From <<https://azure.microsoft.com/en-us/services/sql-database/>>, Retrieved on: Nov. 3, 2017, 16 Pages.

Agichtein, et al., "Extracting relations from xml documents", In Proceedings of International Conference on Conceptual Modeling, Oct. 13, 2003, pp. 1-12.

Andritsos, et al., "Information-theoretic tools for mining database structure from large data sets", In Proceedings of the ACM SIGMOD international conference on Management of data, Jun. 13, 2004, 12 Pages.

Andritsos, et al., "Limbo: Scalable clustering of categorical data", In Proceedings of International Conference on Extending Database Technology, Mar. 14, 2004, 18 Pages.

Auer, et al., "Dbpedia: A nucleus for a web of open data", In Proceedings of the 6th international The semantic web and 2nd Asian conference on Asian semantic web conference, Nov. 11, 2007, 14 Pages.

Basu, et al., "Active semi-supervision for pairwise constrained clustering", In Proceedings of the SIAM International Conference on Data Mining, Apr. 2004, 12 Pages.

Bohannon, et al., "Bridging the XML-relational divide with LegoDB: A Demonstration", In Proceedings of 19th International Conference on Data Engineering, Mar. 5, 2003, pp. 759-761.

Bouma, Gerlof, "Normalized (pointwise) mutual information in collocation extraction", In Proceedings of German Society for Computational Linguistics & Language Technology, Sep. 30, 2009, 11 Pages.

Bradley, et al., "Clustering via concave minimization", In Journal of Advances in neural information processing systems, Dec. 1997, 7 Pages.

Cafarella, et al., "Navigating Extracted Data with Schema Discovery", In Proceedings of the 10th International Workshop on Web and Databases, Jun. 15, 2007, 6 Pages.

Chu, et al., "The case for a wide-table approach to manage sparse relational data sets", In Proceedings of the ACM SIGMOD international conference on Management of data, Jun. 11, 2007, 12 Pages.

Deutsch, et al., "Storing semistructured data with stored", In Proceedings of the ACM SIGMOD international conference on Management of data, May 31, 1999, pp. 431-442.

Garofalakis, et al., "Xtract: a system for extracting document type descriptors from xml documents", In Proceedings of the ACM SIGMOD international conference on Management of data, May 15, 2000, 12 Pages.

Goldman, et al., "Dataguides: Enabling query formulation and optimization in semistructured databases", In Proceedings of the 23rd International Conference on Very Large Data Bases, Aug. 25, 1997, pp. 1-21.

Makanju, et al., "A lightweight algorithm for message type extraction in system application logs", In Journal of IEEE Transactions on Knowledge and Data Engineering, vol. 24, Issue 11, Nov. 2012, pp. 1921-1936.

Makanju, et al., "Clustering event logs using iterative partitioning", In Proceedings of the 15th ACM SIGKDD international conference on Knowledge discovery and data mining, Jun. 28, 2009, pp. 1255-1263.

Miller, et al., "On Schema discovery", In Journal of IEEE Data Engineering Bull, Sep. 2003, pp. 1-6.

Nestorov, et al., "Extracting schema from semistructured data", In Proceedings of ACM SIGMOD international conference on Management of data, Jun. 1998, pp. 1-12.

Nestorov, et al., "Representative objects: concise representations of semistructured, hierarchical data", In Proceedings of 13th International Conference on Data Engineering, Apr. 7, 1997, 12 Pages.

Oliner, et al., "Advances and challenges in log analysis", In Journal of ACM Queue—System Administration, vol. 9, Issue 12, Dec. 20, 2011, pp. 1-11.

Qian, et al., "Crius: User-friendly database design", In Proceedings of the VLDB Endowment, vol. 4, No. 2, Nov. 2010, pp. 81-92.

Rahm, et al., "A survey of approaches to automatic schema matching", In International Journal on Very Large Data Bases, vol. 10, Issue 4, Dec. 2001, pp. 334-350.

Rand, William M., "Objective Criteria for the Evaluation of Clustering Methods", In Journal of the American Statistical Association, vol. 66, No. 336, Dec. 1971, pp. 846-850.

Shanmugasundaram, et al., "Relational Databases for Querying XML Documents: Limitations and Opportunities", In Proceedings of the 25th International Conference on Very Large Data Bases, Sep. 7, 1999, pp. 302-314.

Stein, et al., "Use Sparse Columns", Retrieved From <<https://msdn.microsoft.com/en-us/library/cc280604.aspx>>, Mar. 22, 2016, 9 Pages.

Strehl, et al., "Cluster ensembles—a knowledge reuse framework for combining multiple partitions", In Journal of Machine Learning Research, vol. 3, Mar. 1, 2003, pp. 583-617.

Vaarandi, Risto, "A breadth-first algorithm for mining frequent patterns from event logs", In Proceedings of IFIP International Conference on Intelligence in Communication Systems, Nov. 23, 2004, pp. 293-308.

Wang, et al., "Schema Discovery for Semistructured Data", In Proceedings of the Third International Conference on Knowledge Discovery and Data Mining, Aug. 14, 1997, 4 Pages.

Wu, et al., "Discovering topical structures of databases", In Proceedings of the ACM SIGMOD international conference on Management of data, Jun. 9, 2008, pp. 1019-1030.

Xu, et al., "Survey of clustering algorithms", In Journal of IEEE Transactions on Neural Networks, vol. 16, No. 3, May 2005, pp. 645-678.

Yang, et al., "Summarizing Relational Databases", In Proceedings of the VLDB Endowment, vol. 2, Issue 1, Aug. 24, 2009, 12 Pages.

Yang, et al., "Summary graphs for relational database schemas", In Proceedings of the VLDB Endowment, vol. 4, No. 11, Aug. 29, 2011, pp. 899-910.

Yu, et al., "Schema summarization", In Proceedings of the 32nd international conference on Very large data bases, Sep. 12, 2006, pp. 319-330.

Zhang, et al., "Automatic discovery of attributes in relational databases", In Proceedings of the ACM SIGMOD International Conference on Management of data, Jun. 12, 2011, pp. 109-120.

Ramakrishnan, et al., "Database Management Systems", In Publication of McGraw-Hill, Aug. 2002, 931 Pages.

Schmidt, et al., "Efficient Relational Storage and Retrieval of XML Documents", In Proceedings of Third International Workshop on The World Wide Web and Databases, May 18, 2000, 6 Pages.

\* cited by examiner

FIG. 3

DISCOVERING SCHEMA USING ANCHOR ATTRIBUTES

BACKGROUND

Today, rich data sets consisting of attribute-value pairs such as various telemetry logs are abundant. Unlike traditional relational tables, data records, or records, in the rich data sets have highly heterogeneous combinations of attributes, and often lack explicit schema. For example, traditional relational tables may include one or more indexes and have a common set of columns. Such indexes and common columns of data are not present in the rich data sets. For example, rich data sets may include data from many different web sites and/or applications, making common data columns impractical. The lack of homogenous combinations seriously limits the usability of data. For example, developers and analysts have difficulty navigating and understanding such data, which impedes performing data analysis or building applications using the data.

BRIEF DESCRIPTION OF DRAWINGS

FIG. 3 illustrates a matrix view of a heterogeneous data set.

DETAILED DESCRIPTION

Figure 1:
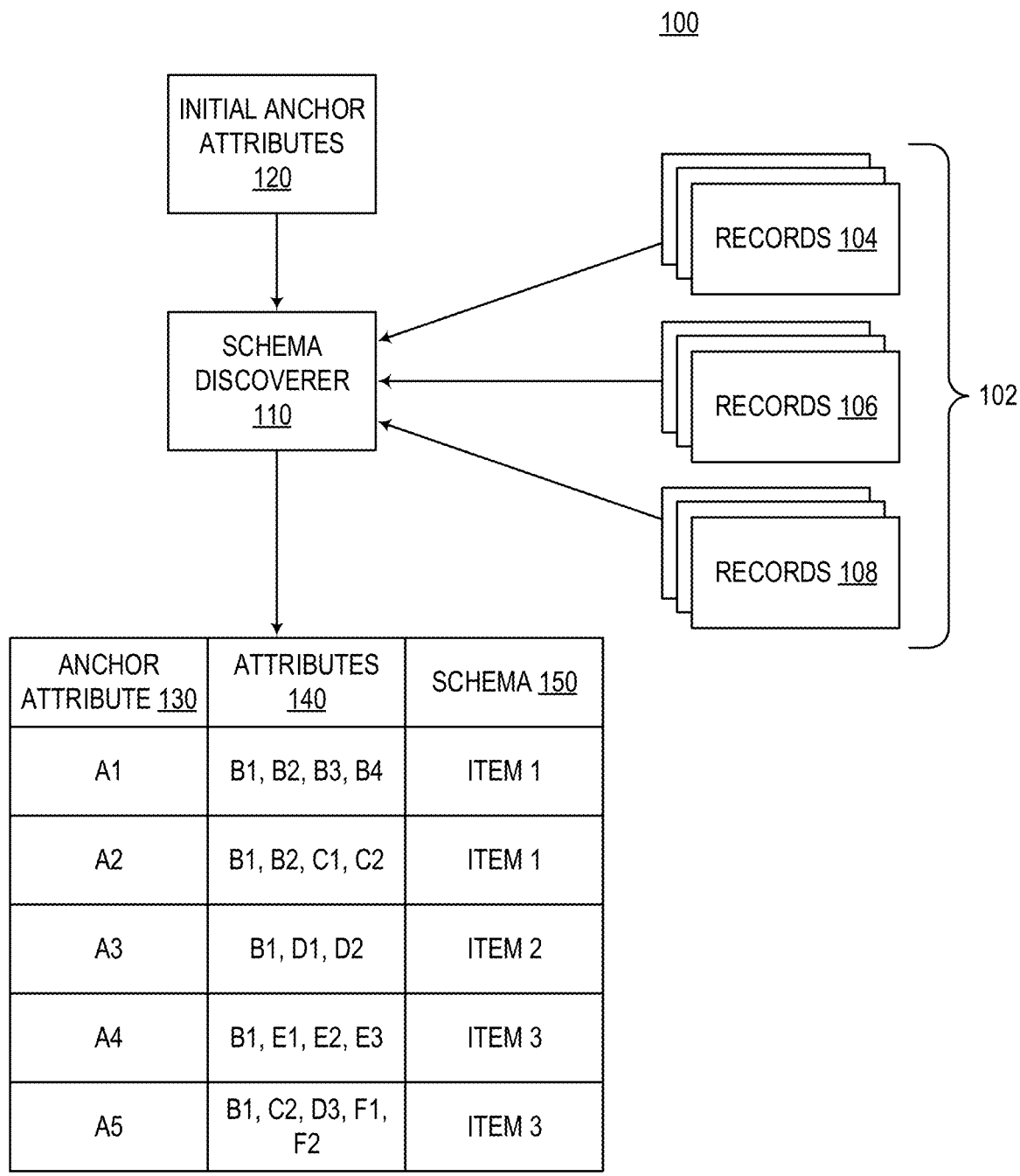
FIG. 1 is a block diagram of a system for discovering schemas in accordance with respective examples.

Today new classes of data sets include diverse attribute-value pairs, such as machine-generated telemetry logs, and are being produced at an unprecedented rate. Having multiple sources creating diverse attribute-value pairs creates a plethora of highly heterogeneous data sets. For example, software systems produce and aggregate various types of telemetry information from different software components for performance analysis and debugging purposes. Similarly, on the web, search engines or comparison shopping sites often aggregate data feeds (e.g., product feeds) from thousands of online retailers and other sources. Applications may create data records that include various attribute-value pairs. Unlike relational tables, the data records may not have a homogenous group of columns (attribute-value pairs). In addition, data records from various sources may be grouped into a single data set.

The high level of heterogeneity of the data records arises because data records are often generated by a large number of sources independently of each other. In addition, a single application may create data records that having missing attributes. Accordingly, using all possible attributes as columns of a single table would lead to incredibly sparse data. The lack of explicit schema in data sets creates significant usability and manageability challenges. As an example, one approach to creating a schema would be to create a schema for each unique set of attributes from all data records. This approach, however, easily could lead to thousands of schema being generated for a single data set. Having thousands of schemas makes the data more difficult to analyze and understand, which reduces the value of the data set. In addition, processing thousands of schemas and joining data with different, but similar, schemas is costly in regards to processing powering and memory consumption.

Another approach is to not use any schemas. Without schemas, however, many existing SQL tools are rendered ineffective or inoperative as these SQL tools require a defined schema. General tools, such as a keyword search, are available for such a schema-less data set. Keyword search, however, is not sufficient for complex data analysis and cannot substitute the functionalities of structured queries such as SQL. For example, researchers found that that keyword queries in Splunk, a log analysis platform, are often ambiguous and tend to result in false matches. In addition, keyword searching was found to be ineffective for advanced tasks such as correlation analysis that requires joins.

Structured queries, such as SQL queries, are better suited for many complex log analysis tasks. SQL queries, however, need schema information for users to understand and navigate the data. Accordingly, extracting schemas from heterogeneous data records from a data set allows the data set to be analyzed using existing SQL and business intelligent tools to build diverse applications. Discovering the schemas, therefore, increases the usability of the data set and allows insights to be discovered within the data that would have remained hidden without the discovered schemas. Further, existing tools may be leveraged to analyze the data set that could not have been used without the discovered schemas. In addition, the described techniques achieve a variety of technical advantages including, but not limited to, decrease data analysis time, increasing computing system speed, conserving memory, and reducing processor load.

In various examples, heterogeneous data sets are analyzed to produce a few logical schema that improve the usability of data and the productivity of developers. These schemas, however, may not be optimized for physical database design. For example, the schemas may not be optimized for space, compression, access efficiency, etc.

In an example, heterogeneous records are schematized by grouping conceptually similar records into clusters, so that only one schema is generated for each group of records. In TABLE 3 below, for example, E1 and E2 may be grouped into one cluster (for records related to memory products), and E3, E4, and E5 into another (for disk products). Accordingly, only two schemas are produced for these five records.

Once records are clustered into groups, a schema of each group can be defined based on requirements of applications. For example, one approach is to define a schema of each group as the union of all the attributes of data records in the group. An alternative is to include only attributes meeting certain frequency thresholds. Both approaches produce useful schema. The approach used may be an application specific decision.

The number of schema created from the data records is reduced by data record clustering. In the example data sets discussed above, thousands or hundreds of thousands of attribute-combinations are reduced to a few dozen schema. With this number of schemas, the data set may be more easily navigated, understood, and analyzed.

While schema discovery and record clustering are not new problems, existing approaches are not suitable for highly heterogeneous data because existing approaches are mostly designed for tables already in relational databases where the level of heterogeneity is low. Specifically, databases typically have tens or hundreds of tables, and records in each table already have identical attributes. In comparison, the level of heterogeneity in unstructured data sets is often orders of magnitude higher than that of traditional databases, e.g., the number of distinct attribute combinations is at least in the thousands.

Given that highly heterogeneous data set may have multiple equally plausible schematization choices, which are non-trivial even for domain-experts to decide, a basic question is whether the problem of defining schemas is too under-specified, and whether it is possible for fully-automatic techniques to consistently discover good schema. In some examples, reliably determining schemas, that are useful for data analyzing, using deterministic or randomized algorithms is impossible without some user input.

Accordingly in an example, user input is received in the form of seed anchor attributes that can uniquely define some sample partitions. A small set of user-provided seed anchors attributes provides enough constraints for the disclosed examples to automatically infer additional record partitions, e.g., additional anchor attributes not provided by the user. For example, attribute co-occurrence statistics using the anchor attributes may be used to identify new anchor attributes.

TABLE 1 shows key statistics of three real-world data sets consisting of attribute-value pairs taken from different application domains. These data sets will be used in various examples below. These data sets are: log records generated by cloud software (System Logs), product feeds aggregated from online retailers (Products), and knowledge-based data from Wikipedia® (Infobox), respectively. TABLES 2, 3, and 4 show example records of each data set. The data sets and associated scenarios are discussed in detail below.

TABLE 1

| Data set | # records | # distinct attributes | # distinct attribute combinations (naive schemas) |
|---|---|---|---|
| System Logs | 207,132 | 1,017 | 3,531 |
| Products | 1,595,082 | 421 | 2,160 |
| Infobox | 1,270,972 | 1,235 | 385,634 |

The data sets shown in TABLE 1 are highly heterogeneous and do not have explicit schema. Column 4 of TABLE 1 shows that the number of distinct attribute combinations in these data sets range from thousands to hundreds of thousands, which in theory can be exponentially larger compared to the number of attributes.

The first data row in TABLE 1 shows data from system logs which includes telemetry log data. In the software industry, complex systems run across thousands of machines in the cloud creating extensive log records that may be used to assist performance analysis and incident investigation.

TABLE 2 shows three example log records and a fraction of their attributes, from a real log dump generated by Microsoft® SQL Azure®, which is a production cloud database system that provides database-as-a-service. Each log record includes a set of attributes and values, with information such as system events and performance counters. While some attributes are common across records (e.g., machine, timeflag), many attribute combinations occur only in some rows.

TABLE 2

| Id | Input Record Attributes & Values | Target Schema |
|---|---|---|
| L1 | machine = AM2SAP20A8C561C, timeflag = 2013-11-09T00:12:22, process id = 6136, application name = BackupService, object name = UserProfile 04011, error dump = [NODE214] faulted, . . . | sql-trace |
| L2 | machine = AM2SAP20A8C5819, timeflag = 2014-11-09T00:07:49, table group name = UserDb, low key = gAAAAABKnPo, cpu time total = 3822024, physical reads total = 2091, . . . | dm-stats |
| L3 | machine = AM2SAP20A8C5819, timeflag = 2014-11-09T00:07:50, cpu time total = 7183901, physical writes total = 108, . . . | dm-stats |

These log records are highly heterogeneous as shown in TABLE 1, with thousands of distinct attribute combinations. Heterogeneity arises as logs are designed and generated by many developers who independently work on different system components. Developers may further decide to add or delete attributes between releases as needed. Finally, developers sometimes drop attributes if their values are deemed unimportant to reduce logging overhead. For example, in the example shown in TABLE 2, developers may decide that if the attribute physical reads total in L2 is 0, then the attribute is deemed uninteresting and will be omitted in the data record. Such ad-hoc suppression creates more heterogeneity and further complicates the schema discovery problem.

Representing the system logs data set using one table/schema for each unique attribute combination would require thousands of schema. This is clearly too many schemas to manage and analyze, which prevents developers from utilizing this rich data set for performance analysis and bug isolation.

Using the disclosed embodiments, the log data set may be schematized into a few dozen schema based on types of the log. For example, L1 has an attribute, error dump, which indicates that it is a sql-trace record. L2 and L3 have the attribute cpu_time_total, suggesting that the records have stats-counters information and thus are dm-stats records. These desired schema assignments are shown in the "Target Schema" column of TABLE 2. These assignments can be equivalently viewed as partitioning of the data set or clustering of individual records.

Once records are grouped and appropriate schema produced (e.g., as the union of all attributes in each group), developers can use schema information to build advanced analysis and applications more easily. For example, they can use SQL queries to perform correlation analysis, which essentially joins incidents such as system crashes (with appropriate selection from the sql-trace schema), with stat counter information leading up to the crash (from the dm-stats schema). Proactive alerting can also be set up similarly for abnormal system behaviors, and dashboards can be built easily using SQL queries with window aggregations.

The second data row in TABLE 1 shows product data from shopping portals/sites. Another real-life scenario encountered involves schematizing heterogeneous data feeds for a shopping portal that aggregates product feeds from hundreds of online retailers. TABLE 3 shows a simplified sample of real product data from a shopping portal. Here each row corresponds to a product offer from an online retailer. The "attributes" column lists a portion of attributes in each record, attribute values are omitted for conciseness.

TABLE 3

| Id | Input Record Attributes (values omitted) | Target Schema | Source |
|---|---|---|---|
| E1 | {url, ts, brand, capacity, mem technology} | memory | w1.com |
| E2 | {url collection, updated, mem technology} | memory | w2.com |
| E3 | {url, ts, brand, capacity, cache size, rpm} | disk | w1.com |
| E4 | {url collection, updated, manufacturer, rpm} | disk | w2.com |
| E5 | {url, ts, capacity, cache size} | disk | w3.com |
| E6 | {url, cache size, price, clock speed, cores} | cpu | w3.com |
| E7 | {url, manufacturer, price, megapixel} | camera | w3.com |

For the purpose of product search, product records may be organized by product categories. Each product category may have a corresponding schema. For example, E1 and E2 may be clustered together in the same schema as both are related to memory products. E3, E4, and E5 may be clustered to the same group as one schema for disks. This grouping corresponds to the "Target Schema" column in TABLE 3. The target schema is not part of the input. The last column, "Source", shows the source from which the product records are obtained. Similar to the log data, the product data set contains considerable heterogeneity, because the combined product data set contains diverse types of products, each with unique attributes (e.g., rpm is unique to disk products). Furthermore, certain attribute of products may often be missing or coded differently between different manufacturers and retailers. Overall, there are thousands of distinct attribute combinations, even though only a few dozen product categories exist.

The identified schemas may benefit a number of applications. For example, for data cleaning, attribute values may be standardized. As an example, "screen-size" values that have different units may be normalized. As another example, for search ranking the schema may be used to show only relevant types of products, e.g., laptops, when a corresponding intent is detected in a query. Search results may be ranked differently for different verticals, e.g., for queries such as "small laptop", "lightweight laptop", such preference can be more easily reflected using order-by clauses on attributes like screen-size or weight. Such ranking uses and needs the determined schema.

The need to schematize heterogeneous records when aggregating diverse data feeds on the web is another common challenge that motivated this work. The third data row in TABLE 1 shows data for data records from a Wikipedia® Infobox data. Infoboxes are a two-column tables listing important attribute-value information of Wikipedia entities, and shown prominently at the top-right of Wikipedia® pages. Each type of entity, e.g., people, company, etc., loosely follows certain templates defined for that type.

TABLE 4 shows a few sample records, where each record has all attribute-value information extracted from one Infobox for one entity. The "Input Record Attributes" column lists names of some of attributes, omitting values, and the "Target Schema" shows the template from which the Infobox was derived, which essentially corresponds to entity-types. Like previous cases, the data records can be horizontally partitioned using the "Target Schema" column, and then a schema may be defined within each partition.

TABLE 4

| Id | Input Record Attributes (values omitted) | Target Schema (Entity Type) |
|---|---|---|
| I1 | {name, nationality, birth place, alma mater, spouse, residence, party, term start} | Officeholder |
| I2 | {name, citizenship, birth place, office, spouse, residence, term start, term end} | Officeholder |
| I3 | {name, nationality, birth, updated, heightft, weight, residence, sport, club} | Sportsperson |
| I4 | {name, birth place, genre, occupation, years active, associated acts, instrument} | Musical artist |
| I5 | {name, artist, cover, genre, length, format, label, released, type, from album} | Single (music) |

Note that unlike the two previous cases, here the target schema information is already known from the data set, because each record is already associated with a template/entity-type name. In this case, the point is not to discover information not present in the data set, rather, the entity type may be used as an additional test case. For example, by not using the schema information to determine the schemas, and then testing if the determined schema matches the entity type.

The infobox data set contains substantial data heterogeneity. Entities of the same type often have missing attributes due to incomplete information, e.g., alma mater is present in I1 but not I2. In effect, each record can have an arbitrary subset of attributes, creating over 300,000 schemas as noted in TABLE 1.

Figure 3:
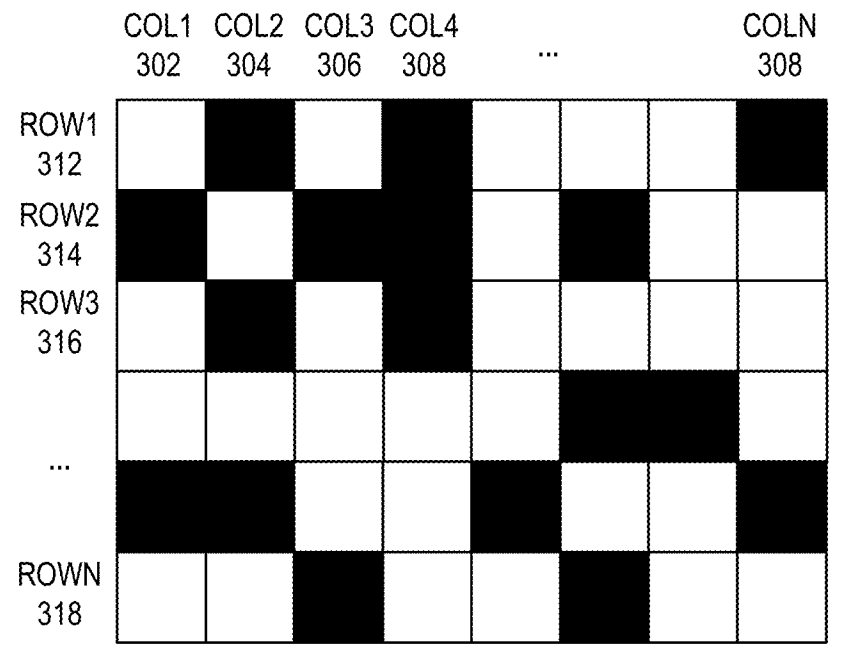

One way to determine schema from data records is to map each distinct combination of attributes into a separate schema. This way produces thousands of schemas for data sets discussed in TABLE 1. This large number of schemas make data analysis impractical. Another class of intuitive approaches is to find "dense" sub-regions with appropriate thresholds. Specifically, the union of all attributes in a data set may be viewed as matrix columns, column 1 302 through column n 308, and records as rows row 1 312 through row n 318, then the data set may be represented as a (sparse) matrix as shown in FIG. 3. Naturally "dense" sub-regions (allowing row and column permutations) are more likely to correspond to a schema (e.g., the sub-matrix row-1 312, row-2 314, row-3 316 and col-1 302, col-2 304, col-3 306, col-4 308 is relatively dense). The hope is that by tuning for appropriate thresholds on width (number of columns), length (number of rows), and density, a good schema can be found. Although the idea is natural, experiments found this approach to be ineffective in practice.

There are two reasons why these approaches are ineffective in practice. First, schema from the same data set can have disparate characteristics. For example, comparing two schema corresponding to "laptop" and "tv" from the product data, the schema of "laptop" is significantly wider, with more interesting attributes, and longer, more "laptop" products, but at the same time sparser. Finding universally good thresholds for all schema is difficult.

Figure 2:
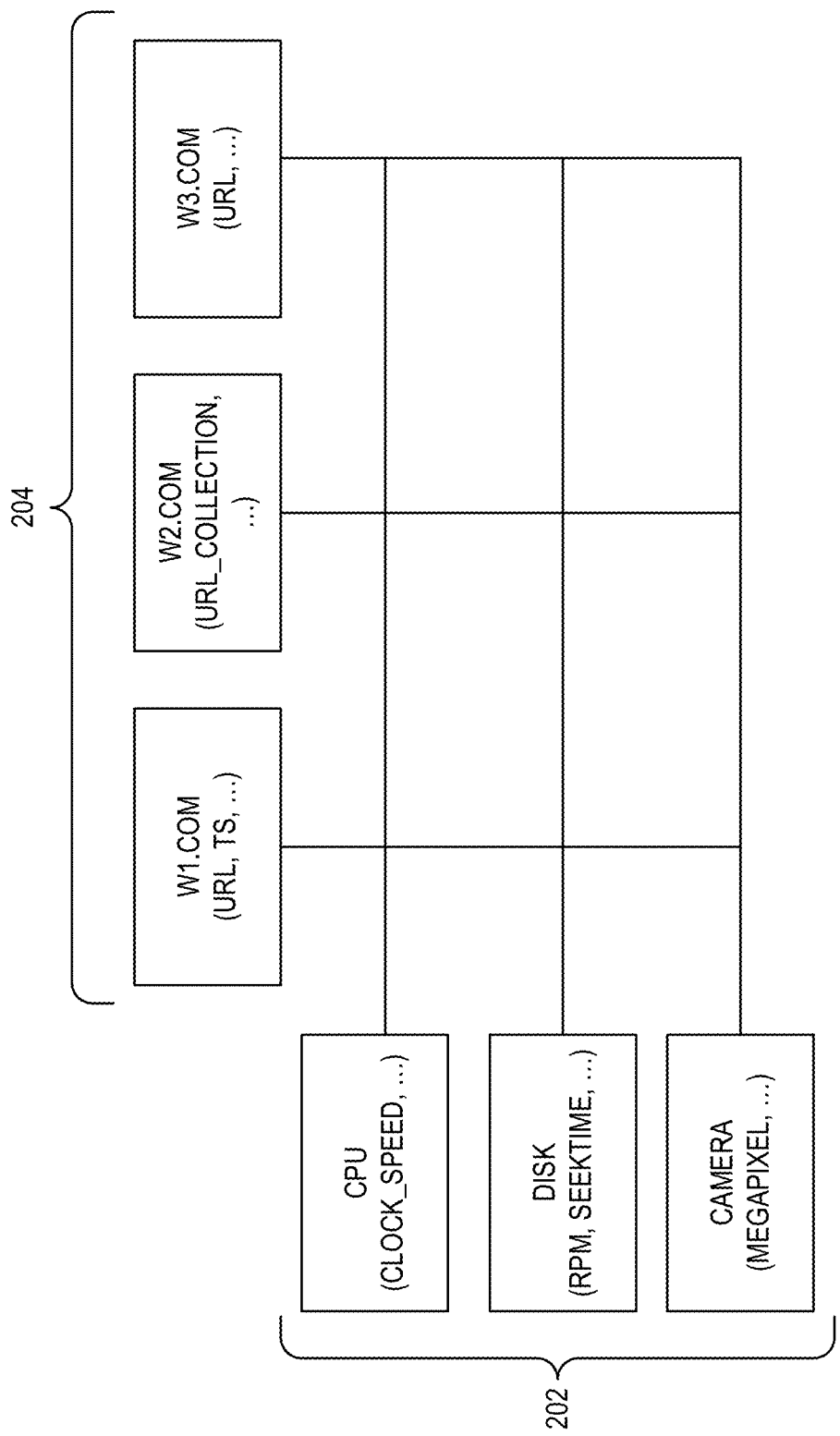
FIG. 2 is a flow diagram of a process for connecting devices using a virtual profile in accordance with respective examples.

The second challenge is more subtle. There often exist multiple orthogonal, but equally valid schematizations. FIG. 2 illustrates the two orthogonal schema dimensions of TABLE 3. For example, in TABLE 3, in addition to schematizing based on product types 202 (i.e., by the "target schema" column), which is what developers want, there is an orthogonal way to schematize based on source websites 204, the last column. In this particular example, records from w1.com and w3.com commonly use attributes such as url and is (time-stamp), while records from w2.com use attributes like url collection and updated. Records in this model can be viewed as being generated by corresponding nodes in two orthogonal dimensions. As such, schema along any of the two dimensions can be equally valid. The question of which one is more desirable is an end-user question, which is something a threshold-based approach cannot decide purely based on data distribution.

Anchor attributes as input help determine how to partition data sets. In various examples, a data set is a set of records $D=\{R_i\}$, where each record $R_i$ includes a set of attribute-value pairs. In an example, only attributes are used to determine a schema without looking at the values. Let $A=\{a_k | k \in [m]\}$ be the universe of attributes. In an example model, each record $R_i$ can be represented as a set of attributes, $R_i \subseteq A$, and the input data set D can be written as $D=\{R_i | R_i \subseteq A, i \in [n]\}$. TABLES 2, 3 and 4 have example records with attribute-value pairs.

In an example to produce schema, the first step is to cluster records into groups, where each group corresponds to a schema. This clustering can be viewed as a disjoint partitioning P of data D. Specifically, the output has p disjoint partitions $P\{P_k | k \in [p], P_k \subseteq D$, such that $P_i \cap P_j \neq \emptyset, \forall_{i \neq j}$, and $\cup_{k \in [p]} P_k = D$. Using disjoint partitioning restricts each record to be assigned to one schema. In practice, desirable schematizations are often either disjoint or hierarchical. In the latter case, techniques for disjoint partitioning may still be applied hierarchically to generate partition hierarchies. General overlapping partitioning, on the other hand, is often too flexible and unconstrained to be effective in practice, given the fuzzy nature of the problem and noisy data sets.

After a partitioning P is produced, a schema of each partition $P_k$, denoted as $S(P_k)$, may then be defined based on application needs. For example, $S(P_k)$ may be defined as the union all attributes in $P_k$, or $S(P_k) = \cup_{R_j \in P_k} \{a | a \in R_j\}$. Note that $S(P_k)$ is logical schema and may be used to navigate data and formulate queries of the data records.

Users often have good intuitive ideas of how to partition their records (e.g., by product types for TABLE 3), which is objectively evaluable using user-labeled ground-truth assignment. The second step of deriving schema $S(P_k)$ given partition $P_k$ is relatively straightforward but may be subjective depending on application needs. In this disclosure, "schema" is used to refer to record partitions and the two terms are used interchangeably when the context is clear.

FIG. 1 is a block diagram of a system 100 for discovering schemas in accordance with respective examples. A collection of records 102 are collected. The collection of records 102 may be stored and retrieved from a storage system. The collection of records 102 may include groups of records 104, 106, and 108, that originate from various different sources. Each group of records includes records that have attribute-value pairs. Example records are shown in TABLES 2, 3, and 4.

Initial anchor attributes 120 are received by a computing device that may be referred to as a schema discoverer 110. The schema discoverer 110 will identify schemas within the collection of records 102 based on the initial anchor attributes 120. An anchor attribute is an attribute that is used to partition the collection of records 102. The initial anchor attributes 120 may include one, two, three, etc. anchor attributes. The initial anchor attributes 120, however, are a relatively small set of attributes to lessen the work done by a user to identify the initial anchor attributes 120. In an example, a user may select the initial anchor attribute 120 from a list of all attributes that are within the collection of records 102. In this example, after an anchor attribute is selected the collection of data records 102 or a portion of the data records 102 may be partitioned by the anchor attribute. The user may then confirm that the anchor attribute should be one of the initial anchor attributes 120.

Using the initial anchor attributes 120, the schema discoverer 110 analyzes the collection of data records to identify additional unprovided anchor attributes. In an example, the schema discoverer 110 creates a collection of all attributes. The schema discoverer 110 then may remove each initial anchor attribute from the collection of all attributes. In addition, other attributes that have a strong co-occurrence with any of the initial anchor attributes may be removed. In an example, the co-occurrence may be measured using normalized point-wise mutual information (NPMI). These co-occurrence attributes are removed based on anchor attributes disjointly partitioning the collection of records 102. Then attributes that have a similar context to records that have one of the anchor attributes are identified. For example, an attribute that has similar co-occurring attributes as known anchor attributes are determined. The most similar attribute may then be selected as an additional anchor attribute. This process may then repeat iteratively until no attributes remain.

After the anchor attributes are identified, the records may be grouped into various schema. In FIG. 1, the identified anchor attributes 130 are listed. The other attributes 140 in the records that correspond to the anchor attribute are shown. The anchor attributes may then be associated with a schema 150. A schema may correspond to more than one anchor attribute, as shown by ITEM 1 and ITEM 3. A single anchor attribute 130, however, is associated with only one schema 150. Each schema may then be used by a developer or application to process and analyze the collection of records 102.

Figure 4:
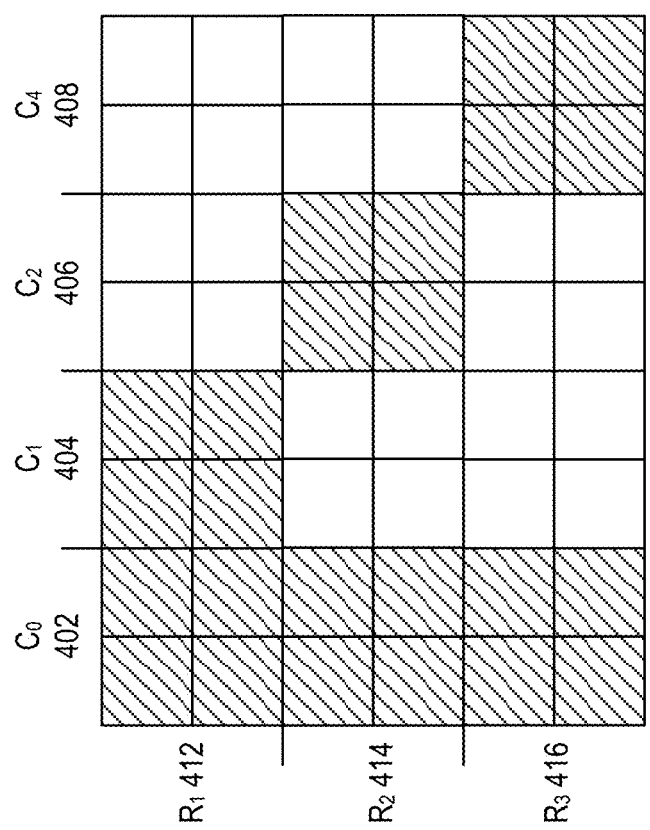
FIG. 4 illustrates a matrix view of three distinctive scheme in accordance with respective examples.
Figure 5:
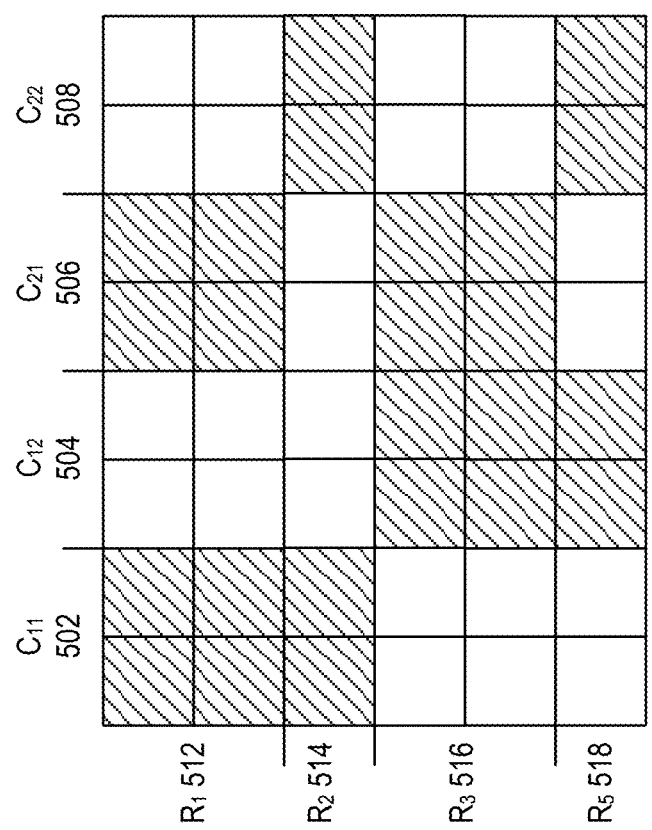
FIG. 5 illustrates a matrix view with two orthogonal dimensions that can be used to determine a schema in accordance with respective examples.

FIG. 4 illustrates a matrix view of three distinctive scheme in accordance with respective examples. FIG. 5 illustrates a matrix view with two orthogonal dimensions that can be used to determine a schema in accordance with respective examples. Each row and column in FIG. 4 and FIG. 5 indicates a set of records and attributes, respectively. A shaded box indicates a record contains a value for that attribute. FIG. 4 shows a scenario with three distinctive partitions: $R_1$ 412, $R_2$ 414, and $R_3$ 416. $C_0$ 402 has common attributes that are shared by all records.

As an example, the three partitions in FIG. 4 may be thought of as product categories in the product data set. Accordingly, $C_0$ 402 corresponds to attributes like product-id that are common to all records. $C_1$ 404, $C_2$ 406, and $C_3$ 408 and are attributes specific to each product category. In FIG. 4 each of rows $R_1$ 412, $R_2$ 414, and $R_3$ 416 can correspond to a partition. Accordingly, there could be three schema: $R_1$ 412×$\{C_0$ 402, $C_1$ 404$\}$; $R_2$ 414×$\{C_0$ 402, $C_2$ 406$\}$; and $R_3$ 416×$\{C_0$ 402, $C_3$ 408$\}$.

FIG. 5 shows another scenario where there are two orthogonal dimensions that define schema, which is similar to the case in FIG. 2. The first dimension has two sets of attributes $\{C_{11}$ 502, $C_{12}$ 504$\}$ and the second dimension has attributes $\{C_{21}$ 506, $C_{22}$ 508$\}$. Comparing these dimensions to FIG. 1, $\{C_{11}$ 502, $C_{12}$ 504$\}$ may be thought of as the dimension for product-category 202 (memory, disk, etc.) and $\{C_{21}$ 506, $C_{22}$ 508$\}$ may be thought of as the data source 204. Because attributes in these dimensions are orthogonal, the cross-product of these two dimensions creates four sets of records: $R_1$ 512, $R_2$ 514, $R_3$ 516, and $R_4$ 518. In addition, because there are two dimensions there are two ways the data records may be partitioned. The data records may be partitioned along $\{C_{11}\ 502, C_{12}\ 504\}$ the partitions are $\{R_1\ 512, R_2\ 514\}$ and $\{R_3\ 516, R_4\ 518\}$. The data records may also be partitioned along $\{C_{21}\ 506, C_{22}\ 508\}$ which partitions the data records into $\{R_1\ 512, R_3\ 516\}$ and $\{R_2\ 514, R_4\ 518\}$.

Figure 6:
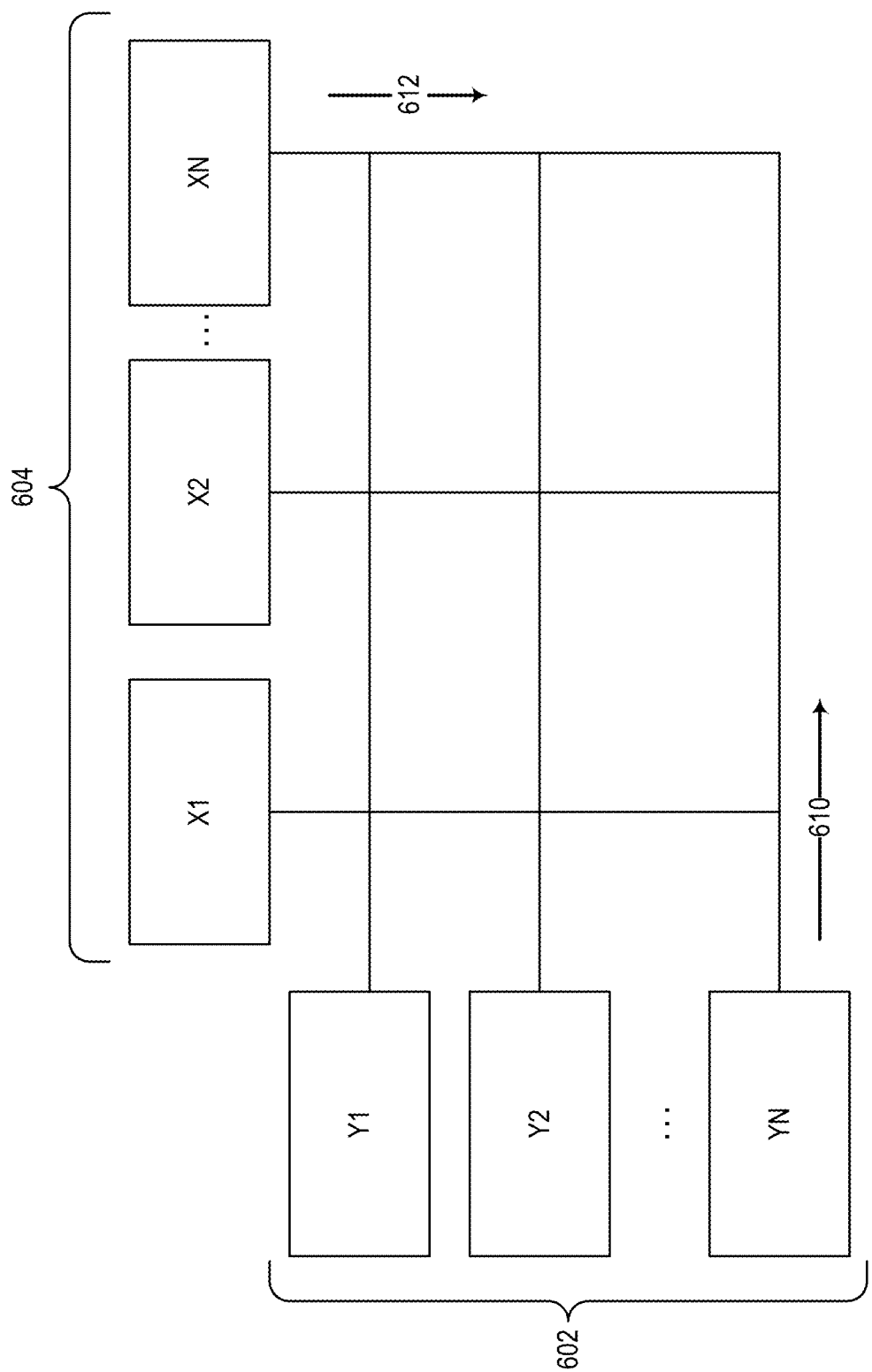
FIG. 6 illustrates a generalized setting for partitioning data records in accordance with respective examples.

An initial set of anchor attributes may be useful for being able to identify other useful anchor attributes. FIG. 6 illustrates a generalized setting for partitioning data records in accordance with respective examples. In FIG. 6, there are two orthogonal sets of schema $X=\{X_i \in [n_1]\}$ and $Y=\{Y_j | j \in [n_2]\}$ for the $n_1$ nodes 604 and $n_2$ nodes 602. Without loss of generality, assume the X schema is a desired schema, so there are $n_1$ schema that need to be produced. In this example, the Y schema is not a desired schema. Because not all $X_i$ and $Y_j$ combinations will correspond to real data records, in the example of FIG. 2, certain websites may not sell certain products, such as w2.com and disks, and thus there are no data records of the combination of w2.com and disks. Suppose the schema at the intersection are produced only when both $X_i$ and $Y_j$ are generated, where $X_i$ is generated with probability $p_1$ 612, and $Y_j$ is generated with probability $p_2$ 610. The probability $p_1 p_2$ is the probability that there is a schema at the intersection of $X_i$ and $Y_j$. Heterogenous data sets commonly include orthogonal schema dimensions.

When a data set includes orthogonal sets of schema, the data set alone cannot be used to produce a desired schema. Formally this problem may be described as $X=\{X_i\}$ and $Y=\{Yi\}$ as two orthogonal sets of schema present in data set D drawn from an underlying distribution S. Suppose schema X is the described schema. No algorithm, deterministic or randomized, can only utilize D to produce X for all distributions S with more than a 50% success rate.

This can be seen by imagining a data distribution S in which X and Y are made to have identical distributions, such that rewriting $X_i$ and $Y_i$ and $Y_i$ as $X_i$ for all i produces the exact same data. With this construction, the fact that X is preferred cannot be distinguished from the data itself, so no algorithm will be more than 50% accurate at finding X versus finding Y as the schema from the data set.

In various examples, anchor attributes are used to partition data records. In an example, an initial set of anchor attributes are provided as input. The number of initial anchor attributes provided as input may be one, two, three, etc. Formally, an anchor attribute may be defined as follows. Let $P(R) \in P$ be the partition function that maps record R to its corresponding partition. An attribute $a \in A$ is an anchor attribute, if:
(i) partition homogeneity: $\forall R_i, R_j \in D$ with $a \in R_i, a \in R_j$, then $P(R_i) = P(R_j)$; and
(ii) mutual exclusion: let $b \in A$, $b \neq a$, be any other anchor, then $\forall R_i, R_j \in D$ with $a \in R_i, b \in R_k$, then $P(R_i) \neq P(R_k)$.

An attribute a is an anchor if (i) all records with that attribute a should always be in the same partition, and (ii), any record with a different anchor b should be in a different partition. Such anchor attributes quickly constrain possible partitions of the data set. In TABLE 3, for example, attribute mem_technology is an anchor that defines schema memory. Similarly, attribute rpm is an anchor for disk, and clock speed for cpu, etc. Attributes in bold-face in TABLE 2, TABLE 3 and TABLE 4 are all anchor attributes. In various examples, anchor attributes are relatively easy to identify when browsing sample records. Candidate anchors may then be verified by inspecting additional records with these attributes.

In various examples, not all records will have an anchor attribute. For example, E5 in TABLE 3 has no anchor attributes as (cache size is used by both cpu and disk). The schema for this data record, however, may still be determined. For example, the schema assignments of such records may be determined based on attribute similarity of these records and that of known anchor partitions. E5 is most similar to records like E3 based on their attributes, so E5 may be assigned to the disk partition. In the formal definition of an anchor attribute above, single attribute occurrence is used as anchor attributes. In principle this may be extended to include conjunction or disjunction of attributes.

In an example, to collect the initial anchor attributes a random sample of records may be visually shown. The attributes and values are displayed. These records may be displayed via a user interface. Based on the desired schematization (e.g., product types), users may select an attribute as an anchor attribute (e.g., attribute mem_technology).

The system may then show additional records containing that candidate anchor for the user to verify. A user may inspect the additional records to ensure that the additional records are indeed in the same schema partition. For example, a user may initially select cache_size from E5 in TABLE 3 as an anchor attribute, but after seeing records like E3 and E6 that also have cache_size, the user may determine that cache_size is not an anchor because E3 is a disk record and E6 is cpu. In such cases, more records may be sampled for the user to inspect to identify another candidate anchor attribute. When an anchor attribute is confirmed by the user, this anchor attribute becomes part of the initial anchor attributes. In addition, the anchor attribute selection process may be repeated to select additional initial anchor attributes. Using the initial anchor attributes, various examples automatically determine additional anchor attributes and their associated schema using the initial anchor attributes as well as data distribution statistics from that particular data set.

To determine additional anchor attributes, various signals may be determined from the data records. One possible signal is a negative signal based on anchor attribute mutual exclusion. Based on the formal definition of an anchor attribute above, anchor attributes should be mutually exclusive at the record-level and not co-occurring in same records. This may be expressed as follows. Let a, $b \in A$ be two anchor attributes. Let $R(a) = \{R | R \in D, a \in R\}$ be the set of records containing attribute a, and define R(b) similarly. R(a) and R(b) are mutually exclusive, or $R(a) \cap R(b) = \emptyset$. This follows from the definition of anchor attribute above, because if the converse was true, then at least one $R_i \in R(a) \cap R(b)$, which implies $R_i \in P(a)$ and $Ri \in P(b)$, contradicting part (ii) of the formal definition of an anchor attribute.

In some examples, however, the mutual exclusive property is not strictly adhered to. Noise and/or coincidental cooccurrence in the data records is a reason why the mutual exclusive property is not strictly adhered to. In some examples, a soft-version of mutual exclusivity, which states that different anchors should rarely co-occur is used instead of strict mutual exclusivity. In order to quantify the strength of co-occurrence between attributes an information theoretic metric called Normalized Pointwise Mutual Information (NPMI) may be used. NPMI between two attributes a and b may be defined as follows.

$$NPMI(a, b) = \frac{\log \frac{P(a, b)}{P(a)P(b)}}{-\log P(a, b)}, \text{ where } P(a) = \frac{|R(a)|}{|D|},$$

$$P(b) = \frac{|R(b)|}{|D|}, \text{ and } P(a, b) = \frac{|R(a) \cap R(b)|}{|D|}.$$

NPMI is a normalized score in the range of [−1, 1] that quantifies the strength of co-occurrence. If the co-occurrence is pure random coincidence, NPMI will be 0. NPMI will be positive if two values frequently co-occur (reaching the limit of 1 if they always co-occur), and negative if the two rarely co-occur (−1 if they never co-occur). In an example, NPMI is used over set-based similarity because NPMI is known to be robust against asymmetric sets. In other examples, set-based similarity may be used.

Using NPMI, the mutual exclusive property is relaxed for a soft version of mutual exclusion. The NPMI for two attributes may be calculated. The two attributes will be considered to be mutually exclusive if their NPMI value is less than a pre-determined number. For example, two attributes may be mutually exclusive if their NPMI value is less than −0.1, −0.25, −0.5, −0.6, −0.75, etc. An NPMI value less than this threshold indicates that the two attributes rarely co-occur in the same data record and the attributes may be considered to be mutually exclusive to one another.

The co-occurrence value between an anchor attribute and another attribute may be used to prune the other attribute from the set of attributes that may become anchor attributes. Stated another way, an attribute that frequently co-occurs with the anchor attribute will not be an anchor attribute. Accordingly, the attribute may be pruned and no longer considered as a possible anchor attribute. Let $a \in A$ be in a known anchor attribute, and $M(a)=\{b|b \in A \backslash a, \text{NPMI}(a,b) > \theta^-\}$ be the set of attributes frequently occurring with a, then no attributes in $M(a)$ can be anchors. In an example, the value $\theta^-$ may be used to determine the mutual exclusive property as described above. In other examples, the values may be different to determine mutual exclusive attributes and what common attributes to prune. This co-occurrence value may be referred to as negative information since the value is used to prune non-anchors.

Given the records in TABLE 3, a user provides mem_technology as a seed anchor attribute. Using soft mutual exclusion, attributes in M(mem_technology) could be ruled out as anchor attributes. In this example, that would include url, ts, brand, capacity, url collection, updated, etc., because the co-occurrence with mem_technology (in E1 and E2) is strong as measured by NPMI. All of these are indeed non-anchors. Attributes that remain (e.g., rpm, price, megapixel, etc.) have a mix of anchors and non-anchors.

The mutual exclusion property is powerful in pruning out non-anchors quickly. For example, in the scenario of FIG. 4, all non-anchors in $C_0$ 402 will be pruned with any one user provided anchor attribute (e.g., $C_1$ 404). In the scenario of FIG. 5 with orthogonal schema, the majority of non-anchor attributes will be pruned with only a few anchor attributes. The following result shows the effects of pruning.

Let $X=\{X_i | i \in [n_1]\}$ and $Y=\{Y_j | j \in [n_2]\}$ be two orthogonal schema, with generative probability $p_i$ and $p_2$, respectively. Suppose a schema in X is desired and k anchors ($k < n_1$) are randomly selected from the true anchors in X. Let f be the number of Y attributes (non-anchors) that are not filtered after mutual exclusion, or $f=n_2-|\cup_{a \in A_k} M(a)|$. From this, the following may be derived:

$$P(f \geq (1+\delta)n_2(1-p_1p_2)^k) \leq \left(\frac{e^\delta}{(1+\delta)^{1+\delta}}\right)^{n_2(1-p_1p_2)^k}.$$

This results may be obtained using Chernoff bound. Similar results may be extended for scenarios with a higher number of orthogonal dimensions. As a concrete example of pruning, suppose $n_1=n_2=100$ (there are 100 schema along each dimension), $p_1=p_2=0.6$. Then with k=10, $P(f \geq 4) \leq 1.1\%$, or the probability of having more than four non-anchors left is no more than 1.1%. With k=5, $P(f \geq 21) \leq 1.9\%$. While mutual exclusion is powerful negative information, in some examples the negative information is paired with positive information to identify additional anchor attributes.

In an example, additional anchor attributes are identified using the co-occurrence of an attribute. The positive attribute context of an attribute, C(a), may be defined as $C(a)=\{b|b \in A, \text{NPMI}(a,b) > \theta^+\}$. The value $\theta^+$ is greater than zero. C(a) defines the set of attributes frequently co-occurring with a as measure by NPMI. The set of attributes serve as the context of a in the data set. This attribute content may then be used to find other likely anchors, via context similarity.

Context similarity may be defined as follows. Let $a \in A$ be a known anchor attribute. Let C(a), C(b), and C(c) be the positive attribute context of a, b, and c, respectively. If Sim(C(a),C(b))>Sim(C(a),C(c)), then b is more likely to an anchor than c. The context similarity property states than an attribute is more likely to be an anchor if its attribute context is more similar to the attribute context of known anchor attributes. In other words, context similarity is a measure of how often attributes of a candidate anchor attribute co-occur with attributes co-occur with a known anchor. In an example, weighted Jaccard similarity is used to determine the context similarity. In other examples, distributional similarity calculations such as Jensen-Shannon, L1, etc. may also be used.

TABLE 3 provides an example of context similarity. Let attribute mem_technology be a user-provided seed anchor attribute. Its positive context is C(mem_technology)={url, ts, brand, capacity, url collection, updated}, because these attributes have positive co-occurrence with mem_technology measured by NPMI. From the previous example, possible candidates given anchor attribute mem_technology include rpm, price and megapixel, etc. The positive context C(rpm)={url, ts, brand, capacity, cache_size, url collection, updated, manufacturer}. Calculating Jaccard(C(mem technology), C(rpm))=6/8=0.75, which is the highest among all other candidate anchor attributes. Accordingly, rpm may be selected as an anchor.

In comparison, attributes like price and megapixel have lower context similarity (1/11 and 1/8, respectively), indicating that neither of these attributes should be selected as anchor attributes in this first iteration. In other words, neither price nor megapixel are selected as anchor attributes given the one known anchor attribute, mem_technology. Note, these attributes may be selected as anchor attributes when the process of selecting the most context similar attribute is repeated. In this case, price is a non-anchor, whereas megapixel is an anchor that may be selected in future iterations.

Context similarity helps to find promising anchor attributes. As an example why context similarity with a known anchor a indicates likely anchor attributes, consider the attributes that are in the context C(a). Attributes in C(a) are likely to be ones that are from orthogonal schema dimensions. For example, in the case of E1 and E2 in TABLE 3, with anchor a=mem_technology, attributes in C(a) such as url, ts, and updated are from an orthogonal dimension (i.e., not related to product categories, but from the dimension with website-source as shown in FIG. 2). If the context C(b) of another attribute b has high overlap with these orthogonal attributes in C(a), then b is more likely to be in a consistent dimension as the user-provided anchor attribute and previously determined anchor attributes.

The effectiveness of context similarity may be analyzed looking at FIG. 5. Let $X=\{X_i|i\in[n_1]\}$ and $Y=\{Y_j|j\in[n_2]\}$ be two orthogonal schema, with generative probability $p_i$ and $P_2$, respectively. Suppose, a schema in X is desired and k anchors ($k<n_1$) are randomly selected from the true anchors in X. Let the next anchor selected using context similarity be a, the probability that a is a true-anchor is at least the following:

$$P(f \geq (1+\delta)n2(1-p_1p_2)^k) \leq$$

$$P_r(a \text{ is anchor}) > \left(1 - e^{-\frac{\delta^2\mu}{3}}(1-(1-p_1p_2)^{(1-\delta)(n_1-k)\mu})\right)$$

where $\mu=(1-(1-p_1p_2)^k)n_2$, $\forall 0<\delta<1$.

As a concrete example of attribute context similarity, suppose $n_1=n_2=100$ (there are 100 schema along each dimension), $p_1=p_2=0.6$, and k=5 (5 known anchors), then Pr(a is an anchor)>99%. In an example, the positive and negative signals are used together to identify anchor attributes.

TABLE 5 contains Algorithm 1, shown below, that combines the positive and negative signals in an iterative approach to identify anchor attributes in a data set. Specifically, seed anchors S are used to prune away non-anchors to create a set of current anchor candidates in CS. Next, an attribute that has the maximum context similarity with existing anchor attributes is determined. In an example, the maximum context similarity may be the maximum context similarity with a single known anchor. In another example, the maximum context similarity is a sum of context similarities of all known anchor attributes. The attribute will the maximum context similarity is then selected as an anchor attribute and included in future iterations of pruning and calculating maximum context similarity. When there are no candidate attributes left, the set of anchor attributes has been determined.

Algorithm 1 attempts to find all remaining anchor attributes consistent with user expectation for a class of common data distributions. This is shown as follows. Let $X=\{Xi|i\epsilon[n1]\}$ and $Y=\{Yj|j\epsilon[n2]\}$ be two orthogonal schema, with generative probability p1 and p2, respectively. Suppose, a schema in X is desired and k anchors (k<n1) are randomly selected from the true anchors in X. Let A be the final set of anchors selected by Algorithm 1, the probability that A is correct, or identical to ground truth X, is bounded by the following inequality:

$$P(\text{success}) \geq \left(\frac{e^{\bar{\delta}}}{(1+\bar{\delta})^{1+\bar{\delta}}}\right)^{n_2(1-p_1p_2)^k} + \sum_{i=k}^{n_2} g(i),$$

where $\bar{\delta} = \frac{1}{n_2(1-p_1p_2)^k} - 1$, and g(i) is defined as:

$$g(i) = \sum_{i=k}^{n_2} \binom{n_2}{1}(1-p(k))^i p(k)^{n_2-i}$$

$$(p_1p_2)^i \left(1 - e^{-\frac{\delta^2 p(k)n_2}{3}}\right)(1-(1-p_1p_2)^{(1-\delta)(n_1-i)p(k)n_2}),$$

where $p(k)=(1-(1-p_1p_2)^k)$.

TABLE 5

Input: An attribute graph G, a set of seed anchors S ∈ A
Output: Additional anchors K ∈ A
1: Current candidate set CS = A \ ∪$_{a \in S}$(M(a))
2: Selected anchor set K = Ø
3: while CS ≠ Ø
4:   max_a = argmax$_{a \in CS}$ (Σ$_{b \in (K \cup S)}$ W(a, b))
5:   K = K ∪ {max_a}
6:   CS = CS \ (M(max_a) ∪ {max_a})
7: Return all new anchors K FIGS. 4 and 5 may be used to illustrate the algorithm 1 shown in TABLE 5. Suppose a seed anchor is provided, $a \in C_1$. The context C(a) of a may be computed as $C_1 \cup C_0$\a. Comparing C(a) with the context of other attributes, an attribute $b \in C_2 \cup C_3$ will be selected as an anchor attribute for having high context similarity. Suppose $b \in C_2$, then finally $c \in C_3$ will be selected as an achor attribute, and all other attributes will be pruned away (A\M(a)∪M(b)∪M(c))=Ø). Given the three anchors a, b, and c three corresponding partitions $R_1$, $R_2$, and $R_3$ can be produced.

In regard to FIG. 5, suppose the desired partitions are $\{R_1, R_2\}$ and $\{R_3, R_4\}$, which correspond to the schema division $C_{11}$ and $C_{12}$. In this example, the seed anchor attribute is a E $C_{11}$. The context C(a)=$C_{11} \cup C_{21} \cup C_{22}$ \ a. Then an attribute $b \in C_{12}$ will be selected based on positive signals, because $b \in M(a)$ and has the highest context similarity (C(b)= $C_{12} \cup C_{21} \cup C_{22}$\b). At that point A\(M(a)∪M(b))=Ø, meaning no more anchors will be found. With a and b an anchor attributes, the desired partitions $\{R_1, R_2\}$ and $\{R_3, R_4\}$ may be created.

Given the set of produced anchor attributes, the disjoint partitions of data records may be produced. There may exists data records in a data set that have no anchors, e.g., $E_5$ from TABLE 3. In an example, these unpartitioned data records may be distributed to the partition whose attributes are most similar, e.g., to $E_3$ in the case of $E_5$.

Figure 7:
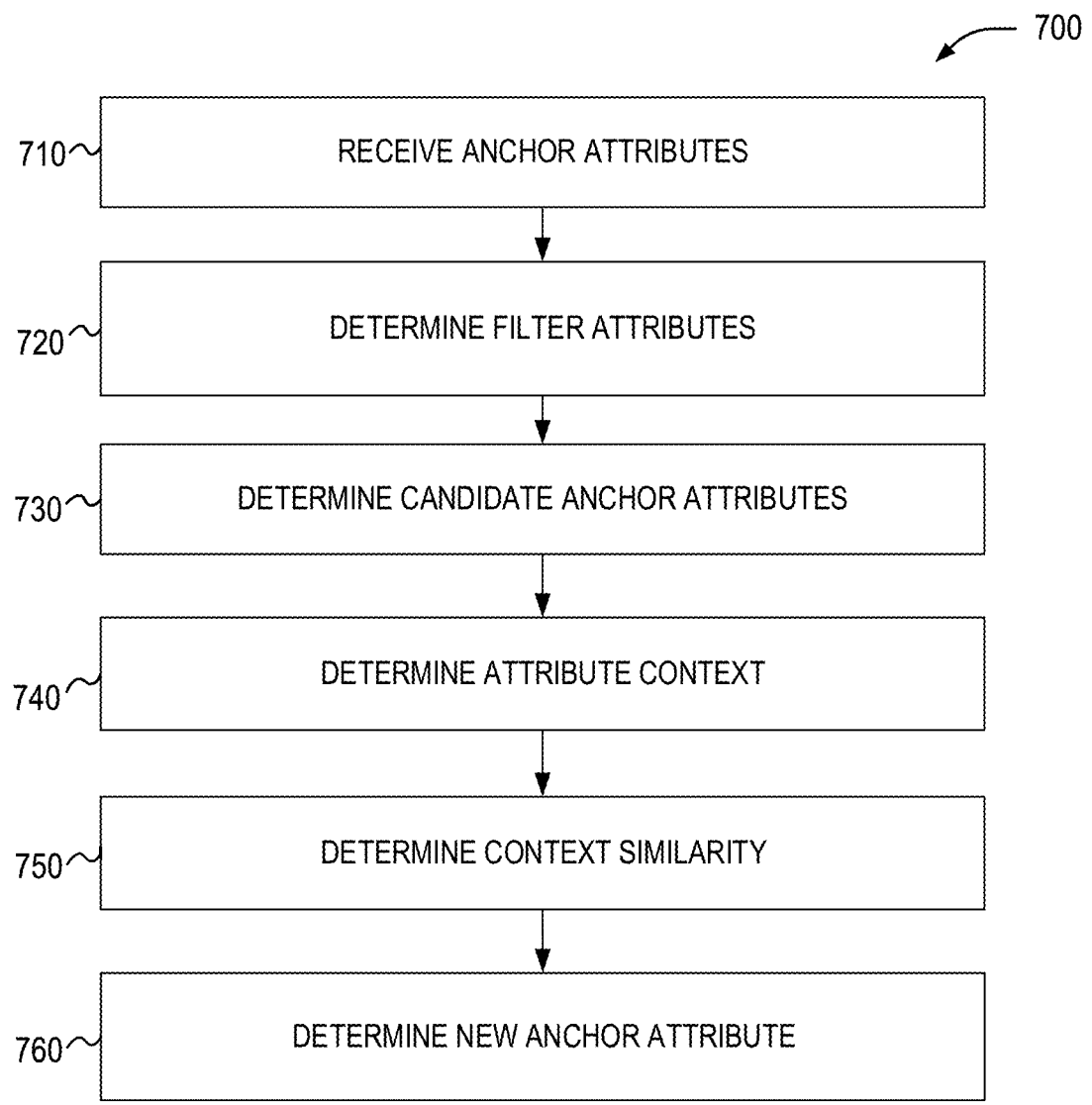
FIG. 7 is a process for partitioning a data set in accordance with respective examples.

FIG. 7 is a process 700 for partitioning a data set in accordance with respective examples. The process 700 may be stored on computer-readable medium, and may be implemented/executed on a computing device. At 710, an initial set of anchor attributes is received for the data set. The data set includes records, with each record including attribute-value pairs. The data set may be heterogeneous, where groups of records do not share a common set of attributes. An anchor attribute may be used to define a single group of related records. For example, an anchor attribute may identify records of one product from a product data set that includes records for many different types of products. In an example, the initial set of anchor attributes is received from a user.

At 720, a set of filter attributes are determined. The filter attributes may be determined as the attributes that are not mutually exclusive with any of the anchor attributes. In other words, the filter attributes include attributes that occur with any of the anchor attributes. Due to noise in a data set, mutual exclusiveness may be relaxed by determining filter attributes that commonly occur with anchor attributes. This allows some attributes that occur with an anchor attribute to be excluded from the filter attributes and therefore, may become an anchor attribute.

At 730, the filter attributes and anchor attributes are removed from the set of all attributes from the data set to create a set of candidate anchor attributes. The candidate anchor attributes include attributes that may become an anchor attribute. At 740, for each attribute in the set of candidate anchor attributes and each anchor attribute an attribute context is calculated. The attribute context is a measure of what other attributes occur with a particular attribute. In an example, the attribute context is measured using NPMI.

At 750, the context similarity between each pair of anchor attributes and candidate anchor attributes is determined based on the attribute context. Context similarity measures how similar two attributes are based on the common attributes that occur with both attributes. At 760, a new anchor attribute is determined based on the context similarity. In an example, the new anchor attribute is the candidate anchor attribute with the highest context similarity with an existing anchor attribute. The new anchor attribute may then be added to the set of anchor attributes. The process may then continue in an iterative manner, by executing 720, 730, 740, 750, and 760, until there are no candidate anchor attributes.

Various experiments were done on real data sets such as logs from Azure® ("Logs"), product fees from a shopping portal ("Products"), and Wikipedia Infobox data ("Infobox"). All of these data sets are highly heterogenous with at least a thousand attribute-value combinations. To test anchor attribute determination, a domain expert partitioned the data. These partitions were used as the ground truth for testing the results of various experiments. The following metrics were used to test the determined anchor attributes.

Let the schema partitions produced by the disclosed system be $P=\{P_1, \ldots, P_n\}$, and the ground truth partitions be $G=\{G_1, \ldots, G_m\}$, the following three metrics were used to evaluate the partitioning quality.

F-Measure (F): F-Measure computes the similarity between partitions and by counting pairs of records on which the two partitioning agree. Specifically, the pairs of records that are assigned in the same partition in both $\mathcal{P}$ and $\mathcal{G}$ are counted, which is also known as true-positive (TP). Similarly true-negative (TN) is the number of pairs assigned to different partitions in $\mathcal{P}$ and $\mathcal{G}$. TP and TN are the desirable cases. False-positive (FP) and false-negative (FN) as the number of pairs assigned in the same petition in $\mathcal{P}$ but not in $\mathcal{G}$, and in $\mathcal{G}$ but not in $\mathcal{P}$, respectively. Given these, traditional Precision ("P") and Recall ("R") may then be defined as: P=(TP)/(TP+TN) and R=(TP)/(TP+FN), and F-measure is the harmonic mean of precision and recall, F=(2PR)/(P+R). F-measure is in the range of [0,1]. A perfect clustering will have an F score of 1.

Rand Index (RI): Rand Index is similar to F-measure but computes quality scores by taking into account both TP and TN, F-measure focuses on TP. Specifically, RI is defined as $$RI = \frac{TP+TN}{TP+TN+FP+FN} = \frac{TP+TN}{\binom{|D|}{2}}$$

RI is also in the range of [0,1], with higher values representing higher quality. Compared to F, RI is biased towards TN where there are a large number of anchor attributes.

Normalized Mutual Information (NMI): NMI is an information theoretic metric that is used to measure clustering quality. NMI is defined as the normalized mutual information of the ground truth $\mathcal{G}$ and the predicted classes $\mathcal{P}$:

$$NMI(\mathcal{G}, \mathcal{P}) = \frac{MI(\mathcal{G}, \mathcal{P})}{(H(\mathcal{P}) + H(\mathcal{G}))/2}$$

Here, MI($\mathcal{G}$, $\mathcal{P}$) is the mutual information MI between $\mathcal{G}$ and $\mathcal{P}$:

$$MI(\mathcal{G}, \mathcal{P}) = \sum_{i \in [n]} \sum_{j \in [m]} Pr(P_i \cap G_j) \log \frac{Pr(P_i \cap G_j)}{Pr(Pi)Pr(Gj)},$$

where $$Pr(P_i \cap G_j) = \frac{|P_i \cap G_j|}{|D|} Pr(Pi) = \frac{|Pi|}{|D|}, \text{ and } Pr(G_j) = \frac{|Gj|}{|D|},$$

respectively. H($\mathcal{P}$) is the entropy of $\mathcal{P}$, defined as H($\mathcal{P}$)=$-\Sigma_{i \in [n]} P_r(P_i) \log P_i$, and H($\mathcal{G}$) is defined similarly. NMI measures the agreement between $\mathcal{G}$ and $\mathcal{P}$ and is in the range of 0 to 1, where a higher value indicates a better agreement between $\mathcal{G}$ and $\mathcal{P}$.

The known partitioning algorithms compared were LIMBO, TGen, iDisc, K-medians, IPLoM, and Naive. These algorithms were compared with an embodiment that implements the algorithms shown in TABLE 5. The various different partitioning implementations were tested on the various data sets discussed above: Logs, Products, and Infobox. The results are shown below in TABLE 6. TABLE 7 shows example anchor attributes and their corresponding schema. In the examples of Products and Infobox, there is a relationship between the anchor attributes and the their corresponding partitions.

TABLE 6

| Data Set | Method | F | RI | NMI |
| --- | --- | --- | --- | --- |
| Logs | Anchor-Graph | 0.916 | 0.98 | 0.948 |
| | Tgen | 0.866 | 0.967 | 0.928 |
| | LIMBO | 0.602 | 0.920 | 0.856 |
| | iDisc | Timeout | Timeout | Timeout |
| | K-medians | 0.263 | 0.295 | 0.235 |
| | IPLoM | 0.413 | 0.900 | 0.746 |
| | Naive | 0.422 | 0.904 | 0.746 |
| Products | Anchor-Graph | 0.787 | 0.925 | 0.711 |
| | Tgen | 0.475 | 0.675 | 0.254 |
| | LIMBO | 0.20 | 0.827 | 0.534 |
| | iDisc | Timeout | Timeout | Timeout |
| | K-medians | 0.415 | 0.783 | 0.390 |
| | IPLoM | 0.133 | 0.803 | 0.346 |
| | Naive | 0.051 | 0.808 | 0.448 |
| Infobox | Anchor-Graph | 0.759 | 0.971 | 0.907 |
| | Tgen | 0.289 | 0.753 | 0.610 |
| | LIMBO | 0.196 | 0.828 | 0.582 |
| | iDisc | Timeout | Timeout | Timeout |
| | K-medians | 0.210 | 0.617 | 0.454 |
| | IPLoM | 0.084 | 0.934 | 0.569 |
| | Naive | 0.027 | 0.932 | 0.454 |

TABLE 7

| Data Set | Anchor | Logical Schema |
| --- | --- | --- |
| Logs | dop | Dm_query_memory_grants |
| | db_name | Dm_io_virtual_file_stats |
| | host_name | Dm_exec_sessions |
| | dependent_low_key | Dm_local_partition_stats |
| | signal_wait_times_ms | Dm_os_wait_stats |
| Products | average_latency | Hard drives |
| | mem_technology | Computer memory |
| | battery | Laptop computer |
| | flash_memory | Memory cards |
| | printer_technology | Printers |
| Infobox | governing_body | nrhp |
| | serviceyears | Military person |
| | show_medals | Sportsperson |
| | result | Military conflict |
| | designations | Planet |

Figure 8:
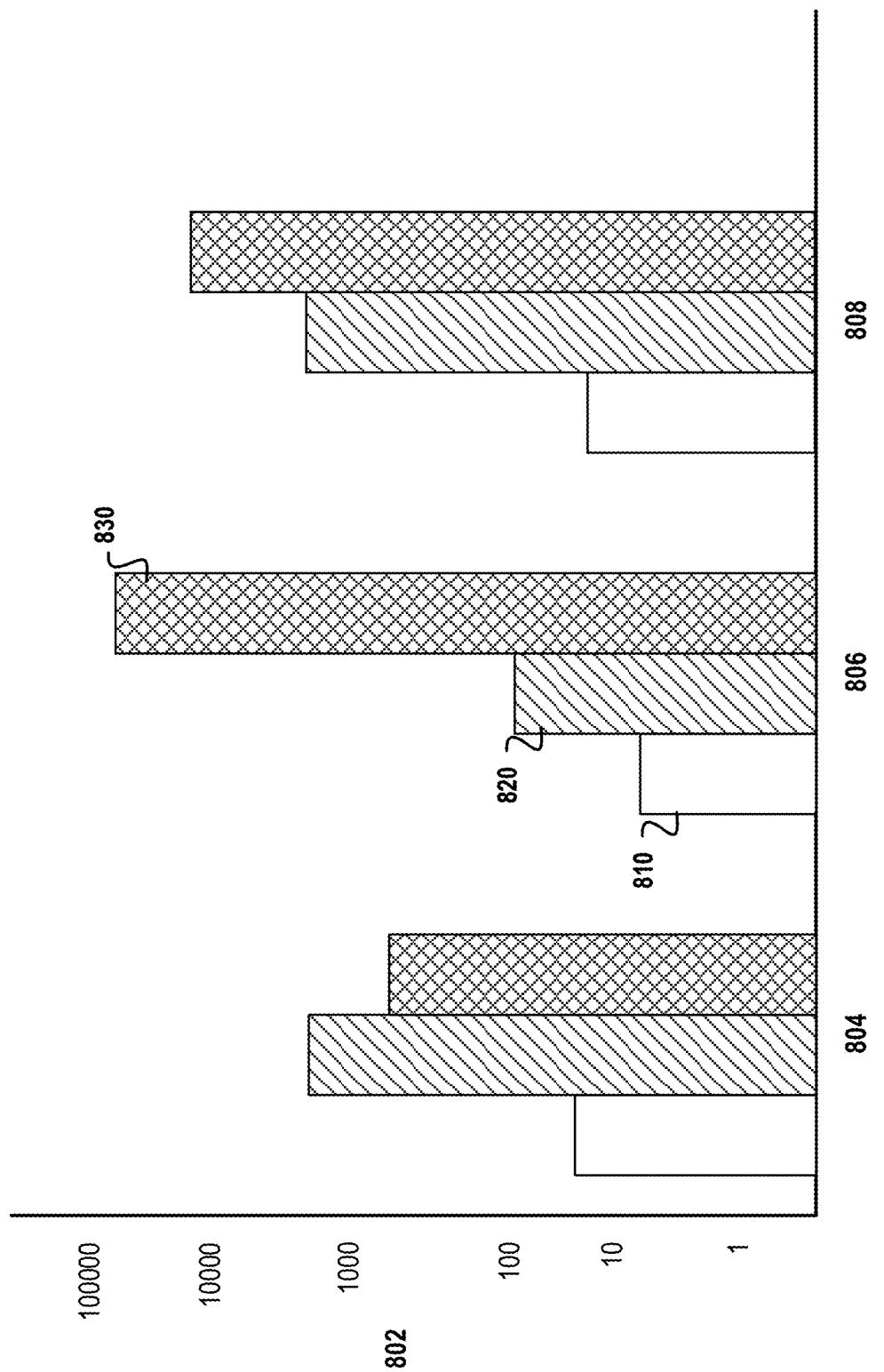
FIG. 8 shows a comparison of execution time on three data sets in accordance with respective examples.

FIG. 8 shows a comparison of execution time on three data sets in accordance with respective examples. The y-axis 802 shows the time in seconds and in logarithmic scale for the execution over three data sets: Logs 804, Product 806, and Infobox 808. Three different methods are shown: anchor-graph 810, TGEN 820, and LIMBO 830, and represented by different bars. Anchor-graph is faster than the other two methods across all data sets 804, 806, and 808. One reason for this is that anchor-graph the most expensive part of the implementation is computing pair-wise attribute co-occurrence, which is $|A|^2$. Also, in some examples the attribute co-occurrences are static, the attribute co-occurrences may be precomputed and reused.

A sensitivity analysis was also performed to understand the effects of different parameters. FIGS. 9A-9D illustrate the results of a sensitivity analysis in accordance with respective examples. These figures plots the F-measure, RI, and NMI values for the Logs data set.

Figure 9A:
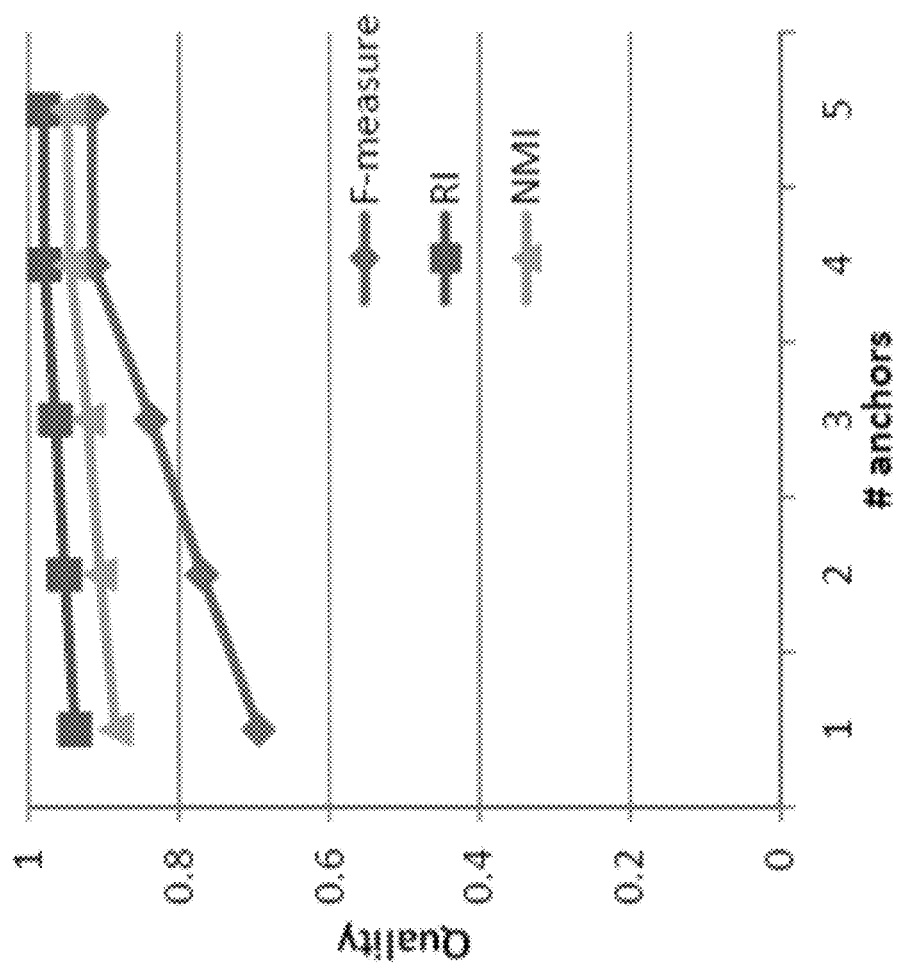
FIGS. 9A-9D illustrate the results of a sensitivity analysis in accordance with respective examples.

FIG. 9A shows result quality varying the number of set anchor attributes used from 1 to 5. Using more anchors quickly improves quality, which plateaus with about 4 anchors. This shows anchor attributes is a clearly useful form of input, and the amount of input needed is quite modest.

Figure 9B:
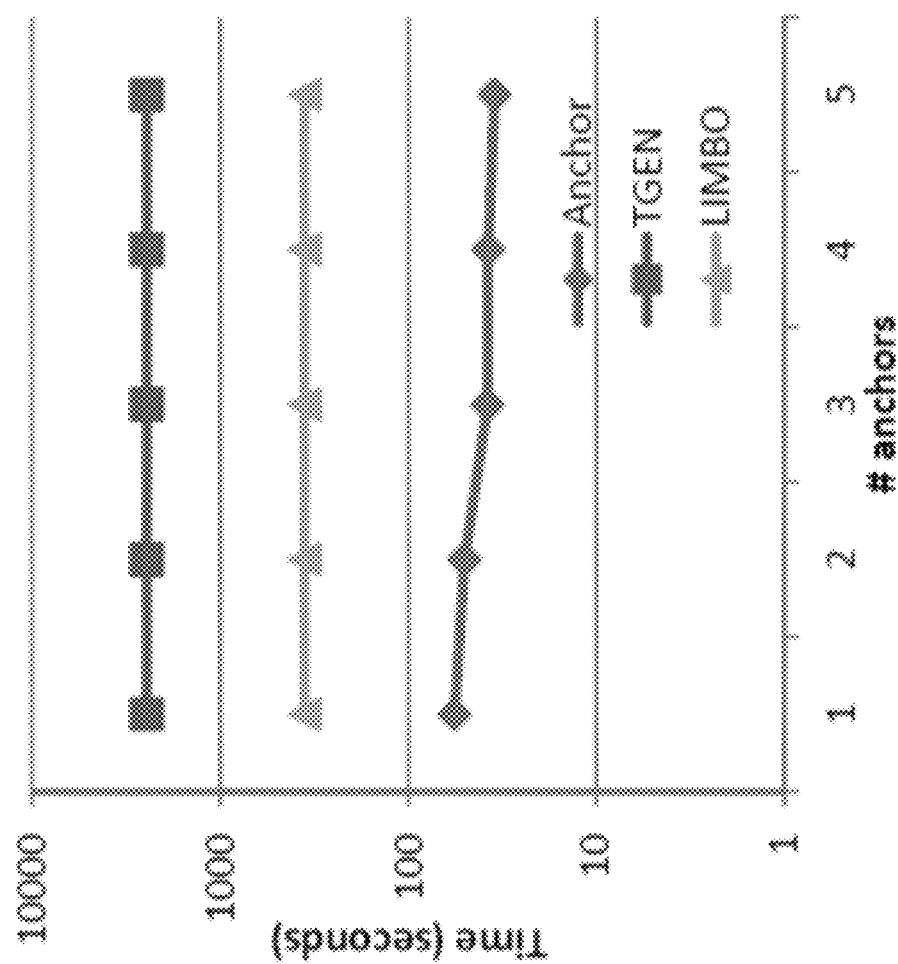

FIG. 9B shows the execution time of Anchor-Graph when varying the number of anchor attributes. Having less anchors slightly increases the execution time, partly because with less anchor-pruning more candidates attribute remain, which leads to more computation. However, Anchor-Graph remains substantially more efficient compared to both TGen and LIMBO in FIG. 9B.

Figure 9C:
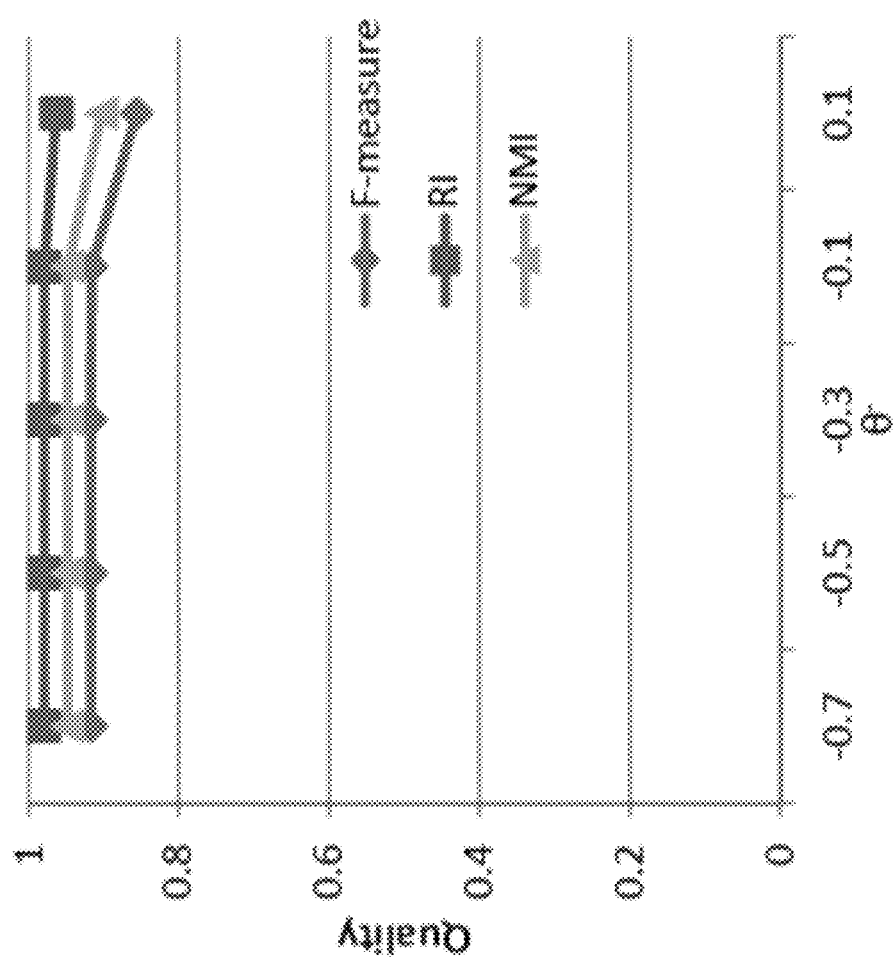
Figure 9D:
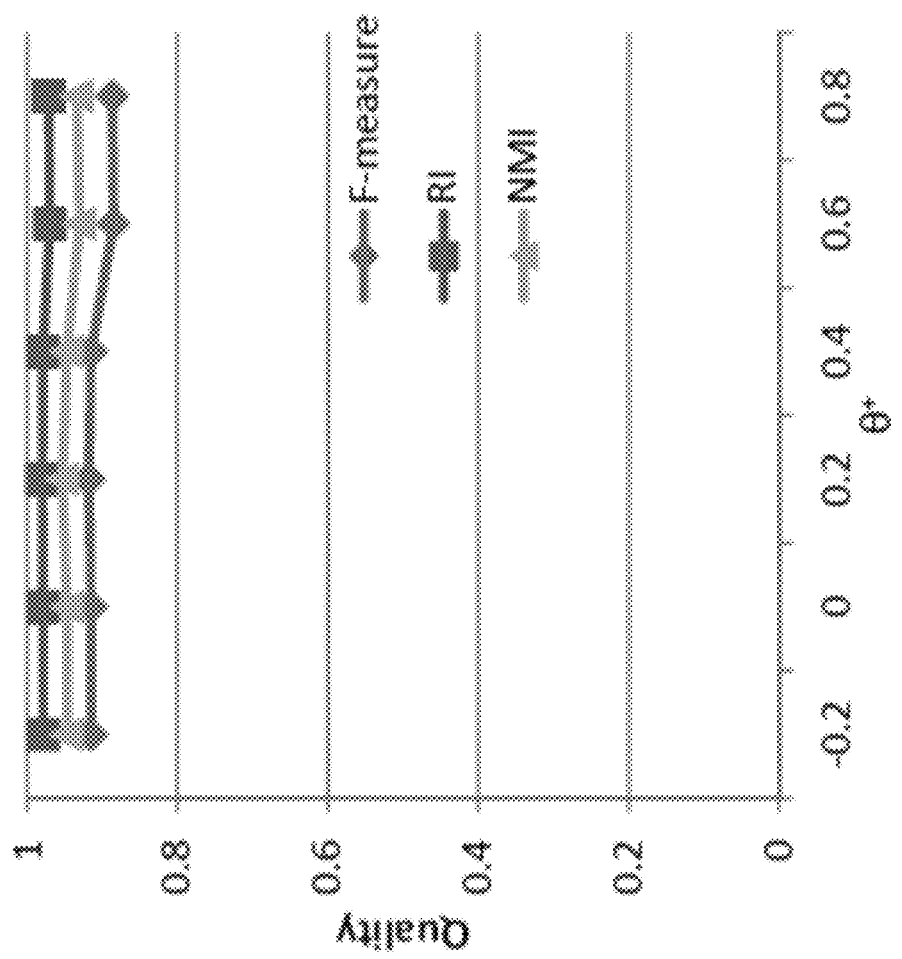

FIG. 9C and FIG. 9D show the quality results varying the thresholds θ− and θ+. Anchor-Graph appears insensitive to both parameters. In FIG. 9C, θ− was varied from 0.7 to 0.1. From FIG. 9C the quality is stable with most negative values, but drops when θ− becomes positive. This is consistent with our reasoning in that pairs of anchors should be rarely co-occurring, thus appearing mutually-exclusive and with negative PMI scores. FIG. 9D, on the other hand, shows that quality remains stable for a wide range of θ+ values, from −0.2 to 0.4, but drops slightly when the values are too high (which lead to smaller attribute contexts $C_{\theta+}(a)$, making candidate selection less robust.

One benefit of schema discovery is that a data set can be partitioned and then the partitions may be queried. To test this benefit, an experiment was done using the publicly available DBpedia query logs, which includes real SPARQL queries issues against the DBpedia endpoint. DBpedia is extracted from the Infobox data set. In many cases, there is a one-to-one correspondence between attribute names from SPARQL queries and attributes in the Infobox data set. For each SPARQL query, the type of entities being queries was determined using keyword matching. Then the set of attributes in Infobox that were used in the query was determined through fuzzy matching. Trivial queries were discarded. In an experiment, fifty queries were used. Two alternative methods for finding relevant attribute and formulate queries were compared to anchor-graph. Random-browse corresponds with randomly browsing through heterogeneous records in Infobox one record at a time, until all relevant attributes to the query are found. The number of records and attributes needed to be inspected on average over 100 randomized runs were measured.

The second alternative method, Targeted-Browse, mimics a user knowing the names of example entities for the entity/schema type in the query. For each query, the user inspects records relevant to the entity type be searching using entity names of the desired type, until all attributes are encountered. This method reduces the amount of irrelevant records reviewed compared to the Random-browse method.

TABLE 10 shows the results of an experiment and provides the median number of attributes and records that were needed to be inspected to formulate a query.

TABLE 10

| Method | Median # attributes | Median # records/schemas |
| --- | --- | --- |
| Random-Browse | 41121.2 | 2582.8 |
| Targeted-Browse | 1499.7 | 150.8 |
| Anchor-Graph | 64 | 2 |

To test the effects of various different attribute properties, a synthetic data set was created with tunable parameters. The synthetic data set was generated with 100 ground truth schemas randomly selected from a space of 1,000 attributes. The width, number of attributes, of each schema was drawn from a normal distribution. The length, number of records, of each schema was also drawn from a normal distribution. Noise was introduced in the data set by randomly perturbing attributes in a schema. In an experiment, for each attribute in the schema, the attribute was replaced with a random attribute with a probability of p. This was called the perturbation probability. For each schema, unique attributes were added. Data sets were then created with varying characteristics. The perturbation probability has a directed impact on the degree of heterogeneity, where a higher p introduces more noise and makes scheme discovery more difficult.

Figure 10A:
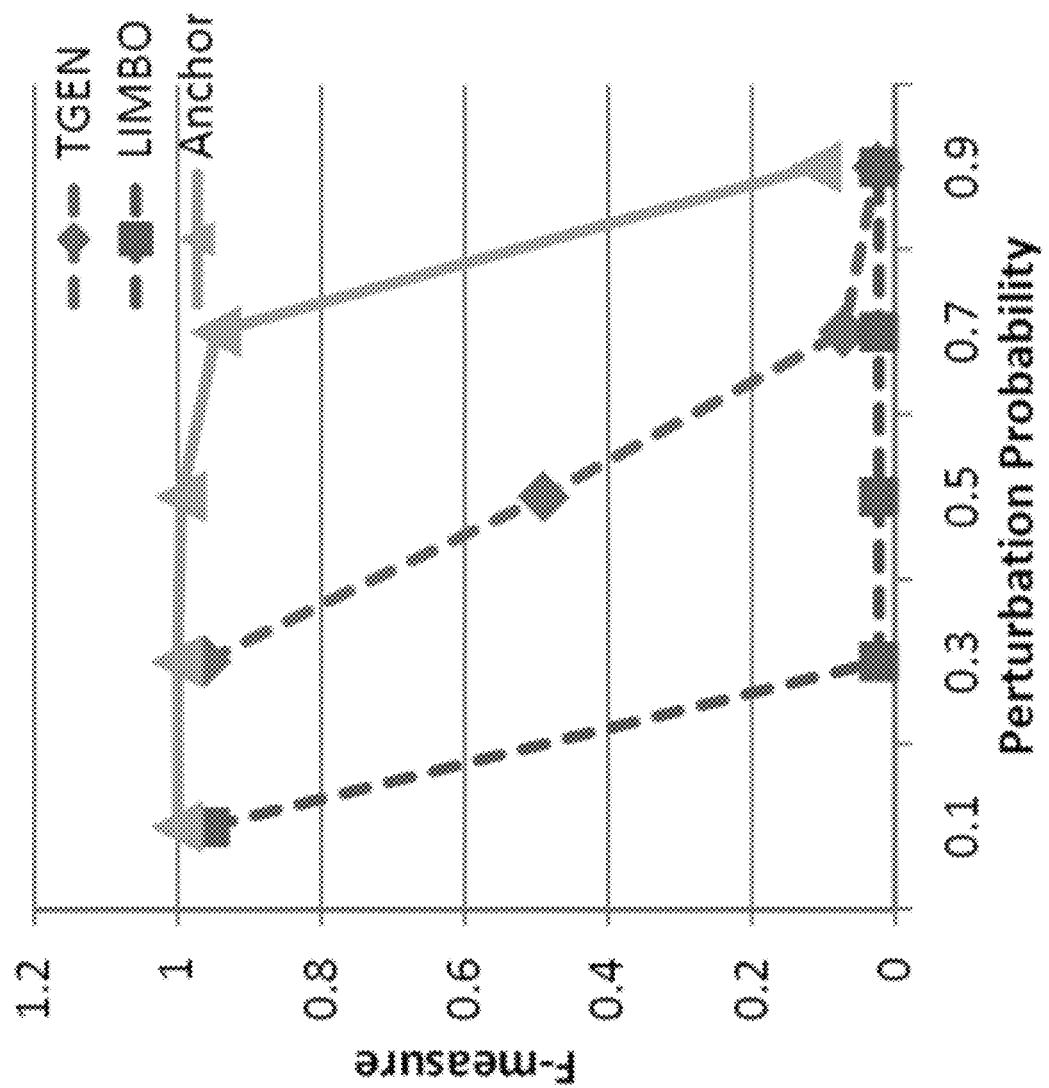
FIGS. 10A and 10B show the results of perturbation probability on F-measure and NMI scores in accordance with respective examples.
Figure 10B:
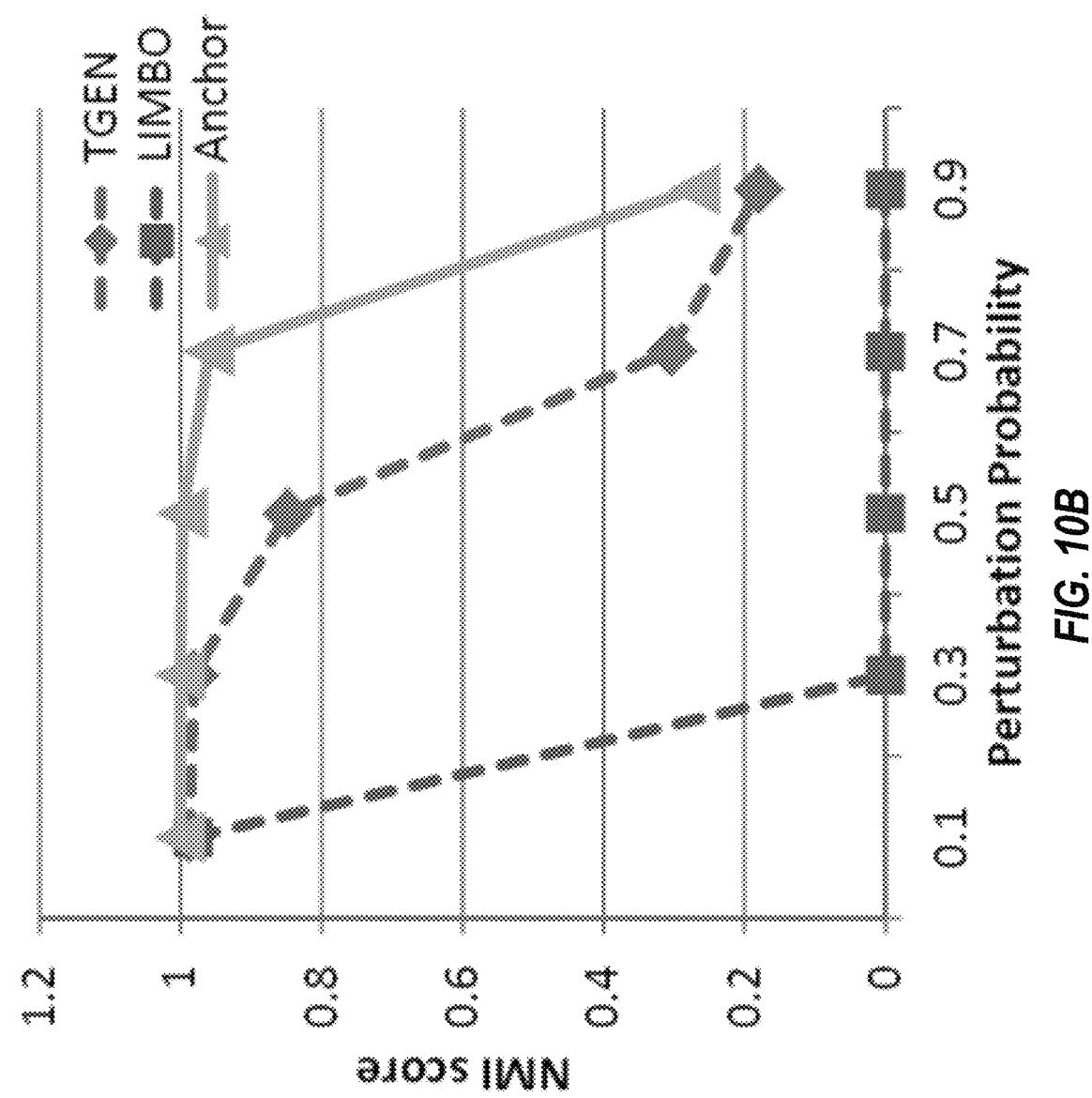

FIGS. 10A and 10B show the results of perturbation probability on F-measure and NMI scores in accordance with respective examples. The results shown in FIGS. 10A and 10B show that Anchor-graph produces quality schema for various perturbation probabilities up to 0.7. When the perturbation probability is at 0.7, the data set is very noisy and heterogenous.

EXAMPLES

Example 1 is a method for partitioning a data set, the method comprising operations performed using an electronic processor, the operations comprising: receiving a plurality of anchor attributes of the data set, wherein the data set comprises a plurality of records, and wherein each record comprises a plurality of attributes; determining a set of filter attributes that are not mutually exclusive with any of the plurality of anchor attributes; determining a set of candidate anchor attributes comprising each unique attribute from the data set excluding the plurality of anchor attributes and the set of filter attributes; determining, for each of the candidate anchor attributes and the plurality of anchor attributes, an attribute context; determining, for each of the candidate anchor attributes, a context similarity between each of the plurality of anchor attributes; and determining a new anchor attribute from the set of candidate anchor attributes based on the context similarity.

In Example 2, the subject matter of Example 1 includes, determining a schema for each of the plurality of attributes.

In Example 3, the subject matter of Example 2 includes, wherein determining a schema for each of the plurality of attributes comprises determining a set of unique attributes from records that include the anchor attribute.

In Example 4, the subject matter of Examples 1-3 includes, wherein determining a set of filter attributes that are not mutually exclusive with any of the plurality of anchor attributes comprises: calculating a cooccurrence value between an attribute and an anchor attribute; and determining the cooccurrence value is greater than a predetermined threshold.

In Example 5, the subject matter of Example 4 includes, wherein calculating a cooccurrence value comprises calculating a normalized point-wise mutual information value.

In Example 6, the subject matter of Example 5 includes.

In Example 7, the subject matter of Examples 1-6 includes, wherein determining a new anchor attribute from the set of candidate anchor attributes based on the context similarity comprises selecting the new anchor attribute with a maximum context similarity.

In Example 8, the subject matter of Example 7 includes, requesting approval of the new anchor attribute.

In Example 9, the subject matter of Example 8 includes, receiving an indication to disapprove the new anchor attribute; and selecting a second new anchor attribute based on a next maximum context similarity.

In Example 10, the subject matter of Examples 1-9 includes, adding the new anchor attribute to the plurality of anchor attributes; and iteratively performing until the set of candidate anchor attributes is empty: adding to the set of filter attributes that are not mutually exclusive with any of the plurality of anchor attributes based on the new anchor attribute; updating the set of candidate anchor attributes comprising each unique attribute from the data set excluding the plurality of anchor attributes and the set of filter attributes; determining, for each of the set of candidate anchor attributes and the plurality of anchor attributes, the attribute context; determining, for each of the set of candidate anchor attributes, the context similarity between each of the plurality of anchor attributes; and determining the new anchor attribute from the set of candidate anchor attributes based on the context similarity.

Example 11 is a system for partitioning a data set, the system comprising: an electronic processor configured to: receive a plurality of anchor attributes of the data set, wherein the data set comprises a plurality of records, wherein each record comprises a plurality of attributes, and wherein each anchor attribute defines a schema of records; determine a set of filter attributes that are mutually exclusive with any of the plurality of anchor attributes; determine a set of candidate anchor attributes comprising each unique attribute from the data set excluding the plurality of anchor attributes and the set of filter attributes; determine, for each of the candidate anchor attributes and the plurality of anchor attributes, an attribute context; determine, for each of the candidate anchor attributes, a context similarity between each of the plurality of anchor attributes; and determine a new anchor attribute from the set of candidate anchor attributes based on the context similarity, wherein the new anchor attribute defines a new schema of records.

In Example 12, the subject matter of Examples 10-11 includes, wherein to determine a set of filter attributes that are not mutually exclusive with any of the plurality of anchor attributes the electronic processor is configured to: calculate a cooccurrence value between an attribute and an anchor attribute; and determine the cooccurrence value is greater than a predetermined threshold.

In Example 13, the subject matter of Example 12 includes, wherein to calculate a cooccurrence value the electronic processor is configured to calculate a normalized point-wise mutual information value.

In Example 14, the subject matter of Example 13 includes.

In Example 15, the subject matter of Examples 11-14 includes, wherein to determine a new anchor attribute from the set of candidate anchor attributes based on the context similarity the electronic processor is configured to select the new anchor attribute with a maximum context similarity.

In Example 16, the subject matter of Example 15 includes, wherein the electronic processor is further configured to request approval of the new anchor attribute.

In Example 17, the subject matter of Example 16 includes, wherein the electronic processor is further configured to: receive an indication to disapprove the new anchor attribute; select a second new anchor attribute based on a next maximum context similarity.

Example 18 is a computer-readable storage media storing computer-executable instructions for partitioning a data set, the stored instructions comprising: instructions to receive a plurality of anchor attributes of the data set, wherein the data set comprises a plurality of records, wherein each record comprises a plurality of attributes, and wherein each anchor attribute defines a schema of records; instructions to determine a set of filter attributes that are not mutually exclusive with any of the plurality of anchor attributes; instructions to determine a set of candidate anchor attributes comprising each unique attribute from the data set excluding the plurality of anchor attributes and the set of filter attributes; instructions to determine, for each of the candidate anchor attributes and the plurality of anchor attributes, an attribute context; instructions to determine, for each of the candidate anchor attributes, a context similarity between each of the plurality of anchor attributes; and instructions to determine a new anchor attribute from the set of candidate anchor attributes based on the context similarity, wherein the new anchor attribute defines a new schema of records.

In Example 19, the subject matter of Examples 10-18 includes, wherein the instructions to determine a set of filter attributes that are not mutually exclusive with any of the plurality of anchor attributes comprise: instructions to calculate a cooccurrence value between an attribute and an anchor attribute; and instructions to determine the cooccurrence value is greater than a predetermined threshold.

In Example 20, the subject matter of Examples 11-19 includes, wherein the instructions to determine a new anchor attribute from the set of candidate anchor attributes based on the context similarity comprise instructions to select the new anchor attribute with a maximum context similarity.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 11:
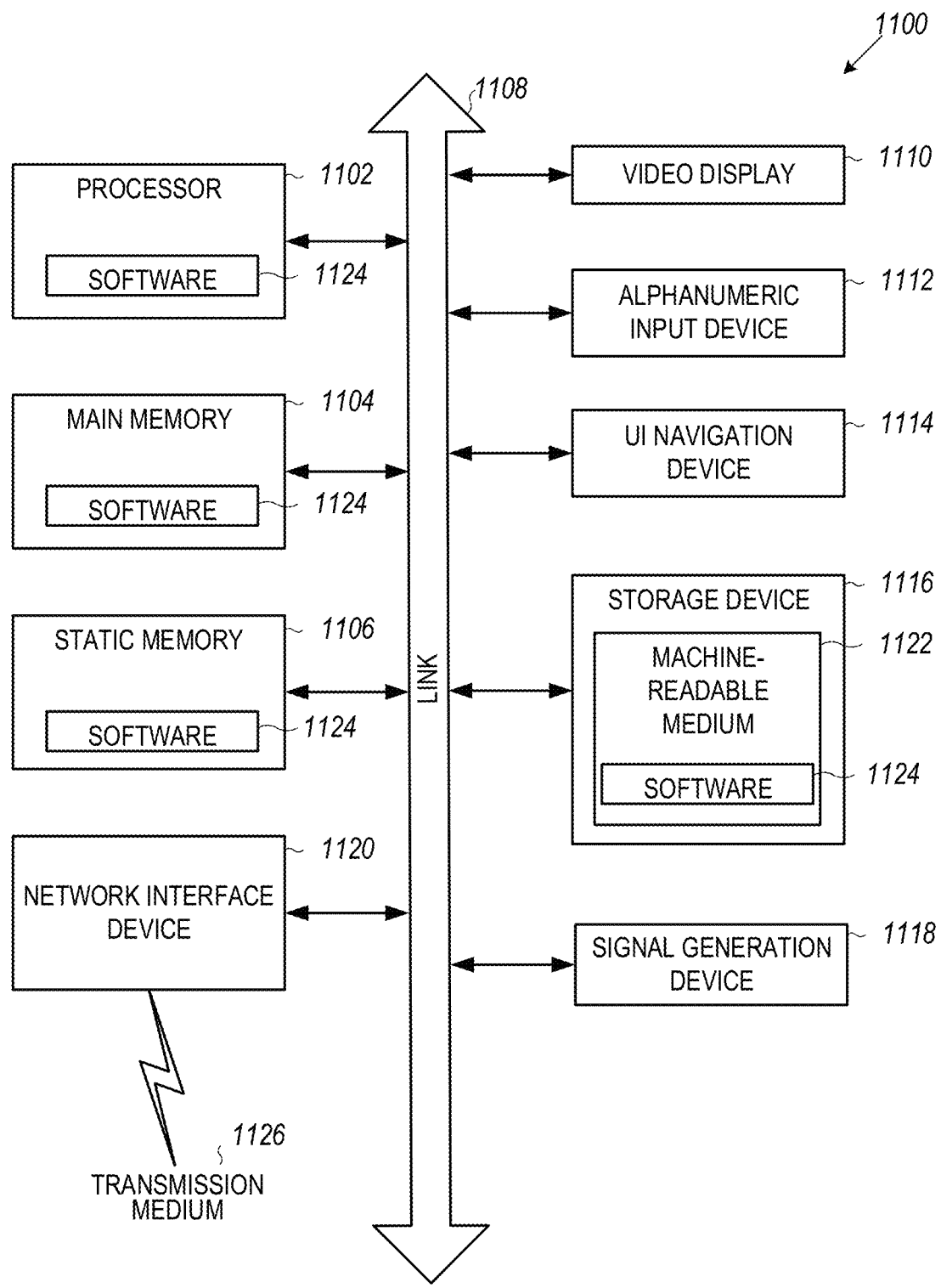
FIG. 11 is an example computing device that can be used in conjunction with the technologies described herein.

FIG. 11 is an example computing device that can be used in conjunction with the technologies described herein. In alternative embodiments, the computing device 1100 may operate as a standalone device or may be connected (e.g., networked) to other computing devices. In a networked deployment, the computing device 1100 may operate in the capacity of a server communication device, a client communication device, or both in server-client network environments. In an example, the computing device 1100 may act as a peer computing device in peer-to-peer (P2P) (or other distributed) network environment. The computing device 1100 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may implement the schema discoverer 110, and perform the method of FIG. 7.

Computing device 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via a link (e.g., bus) 1108. The computing device 1100 may further include a display unit 1110, an input device 1112 (e.g., a keyboard), and a user interface (UI) navigation device 1114 (e.g., a mouse). In an example, the display unit 1110, input device 1112, and UI navigation device 1114 may be a touch screen display. In an example, the input device 1112 may include a touchscreen, a microphone, a camera (e.g., a panoramic or high-resolution camera), physical keyboard, trackball, or other input devices.

The computing device 1100 may additionally include a storage device (e.g., drive unit) 1116, a signal generation device 1118 (e.g., a speaker, a projection device, or any other type of information output device), a network interface device 1120, and one or more sensors 1121, such as a global positioning system (GPS) sensor, compass, accelerometer, motion detector, or other sensor. The computing device 1100 may include an input/output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 1116 may include a computing-readable (or machine-readable) storage media 1122, on which is stored one or more sets of data structures or instructions 1124 (e.g., software) embodying or utilized by any one or more of the techniques or functions described herein. In an example, at least a portion of the software may include an operating system and/or one or more applications (or apps) implementing one or more of the functionalities described herein. The instructions 1124 may also reside, completely or at least partially, within the main memory 1104, within the static memory 1106, and/or within the hardware processor 1102 during execution thereof by the computing device 1100. In an example, one or any combination of the hardware processor 1102, the main memory 1104, the static memory 1106, or the storage device 1116 may constitute computing device (or machine) readable media.

While the computer-readable storage media 1122 is illustrated as a single medium, a "computer-readable storage media" or "machine-readable storage media" may include a single medium or multiple media (e.g., a centralized or distributed database, and/or associated caches and servers) configured to store the one or more instructions 1124.

In an example, a computer-readable storage media or machine-readable storage media may include any medium that is capable of storing, encoding, or carrying instructions for execution by the computing device 1100 and that cause the computing device 1100 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 1120 may use the transfer protocols to transmit data using transitory propagating signals.

In an example, the network interface device 1120 may include one or more physical jacks (e.g., Ethernet, coaxial, or phone jacks) or one or more antennas to connect to the communications network 1126. In an example, the network interface device 1120 may include one or more wireless modems, such as a Bluetooth modem, a Wi-Fi modem or one or more modems or transceivers operating under any of the communication standards mentioned herein. In an example, the network interface device 1120 may include a plurality of antennas to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. In an example, a transmission medium may include any intangible medium that is capable of storing, encoding or carrying instructions for execution by the computing device 1100, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for partitioning a data set, the method comprising operations performed using an electronic processor, the operations comprising:
   receiving a plurality of initial anchor attributes of the data set, wherein the data set comprises a plurality of records, and wherein each record comprises a plurality of attribute-value pairs;
   determining a set of filter attributes from the attributes of the attribute-value pairs that commonly occur with the initial anchor attributes and are not mutually exclusive with any of the plurality of anchor attributes;
   determining a set of candidate anchor attributes from the attributes of the attribute-value pairs comprising each unique attribute from the data set excluding the plurality of anchor attributes and the set of filter attributes;
   determining, for each of the candidate anchor attributes and the plurality of anchor attributes, an attribute context;
   determining, for each of the candidate anchor attributes, a context similarity between each of the plurality of anchor attributes; and
   determining a new anchor attribute from the set of candidate anchor attributes based on the context similarity.

2. The method of claim 1, further comprising determining a schema for each of the plurality of attributes of the attribute-value pairs of the data set.

3. The method of claim 2, wherein determining a schema for each of the plurality of attributes comprises determining a set of unique attributes from records that include the anchor attribute.

4. The method of claim 1, wherein determining a set of filter attributes that are not mutually exclusive with any of the plurality of anchor attributes comprises:
   calculating a cooccurrence value between an attribute and an anchor attribute; and
   determining the cooccurrence value is greater than a predetermined threshold.

5. The method of claim 4, wherein calculating a cooccurrence value comprises calculating a normalized pointwise mutual information value.

6. The method of claim 5, wherein the predetermined threshold is −0.5.

7. The method of claim 1, wherein determining a new anchor attribute from the set of candidate anchor attributes based on the context similarity comprises selecting the new anchor attribute with a maximum context similarity.

8. The method of claim 7, further comprising requesting approval of the new anchor attribute.

9. The method of claim 8, further comprising:
   receiving an indication to disapprove the new anchor attribute; and
   selecting a second new anchor attribute based on a next maximum context similarity.

10. The method of claim 1, further comprising:
    adding the new anchor attribute to the plurality of anchor attributes; and
    iteratively performing until the set of candidate anchor attributes is empty:
    adding to the set of filter attributes that are not mutually exclusive with any of the plurality of anchor attributes based on the new anchor attribute;
    updating the set of candidate anchor attributes comprising each unique attribute from the data set excluding the plurality of anchor attributes and the set of filter attributes;
    determining, for each of the set of candidate anchor attributes and the plurality of anchor attributes, the attribute context;
    determining, for each of the set of candidate anchor attributes, the context similarity between each of the plurality of anchor attributes; and
    determining the new anchor attribute from the set of candidate anchor attributes based on the context similarity.

11. A system for partitioning a data set, the system comprising:
    an electronic processor configured to:
    receive a plurality of initial anchor attributes of the data set, wherein the data set comprises a plurality of records, wherein each record comprises a plurality of attribute-value pairs, and wherein each initial anchor attribute defines a schema of records;
    determine a set of filter attributes from the attributes of the attribute-value pairs that commonly occur with the initial anchor attributes that are mutually exclusive with any of the plurality of anchor attributes;
    determine a set of candidate anchor attributes from the attributes of the attribute-value pairs comprising each unique attribute from the data set excluding the plurality of anchor attributes and the set of filter attributes;
    determine, for each of the candidate anchor attributes and the plurality of anchor attributes, an attribute context;
    determine, for each of the candidate anchor attributes, a context similarity between each of the plurality of anchor attributes; and
    determine a new anchor attribute from the set of candidate anchor attributes based on the context similarity, wherein the new anchor attribute defines a new schema of records.

12. The system of claim 11, wherein to determine a set of filter attributes that are not mutually exclusive with any of the plurality of anchor attributes the electronic processor is configured to:
  calculate a cooccurrence value between an attribute and an anchor attribute; and
  determine the cooccurrence value is greater than a predetermined threshold.

13. The system of claim 12, wherein to calculate a cooccurrence value the electronic processor is configured to calculate a normalized point-wise mutual information value.

14. The system of claim 13, wherein the predetermined threshold is −0.5.

15. The system of claim 11, wherein to determine a new anchor attribute from the set of candidate anchor attributes based on the context similarity the electronic processor is configured to select the new anchor attribute with a maximum context similarity.

16. The system of claim 15, wherein the electronic processor is further configured to request approval of the new anchor attribute.

17. The system of claim 16, wherein the electronic processor is further configured to:
  receive an indication to disapprove the new anchor attribute;
  select a second new anchor attribute based on a next maximum context similarity.

18. A computer-readable storage media storing computer-executable instructions for partitioning a data set, the stored instructions comprising:
  instructions to receive a plurality of initial anchor attributes of the data set, wherein the data set comprises a plurality of records, wherein each record comprises a plurality of attribute-value pairs, and wherein each anchor attribute defines a schema of records;
  instructions to determine a set of filter attributes from the attributes of the attribute-value pairs that commonly occur with the initial anchor attributes and that are not mutually exclusive with any of the plurality of anchor attributes;
  instructions to determine a set of candidate anchor attributes from the attributes of the attribute-value pairs comprising each unique attribute from the data set excluding the plurality of anchor attributes and the set of filter attributes;
  instructions to determine, for each of the candidate anchor attributes and the plurality of anchor attributes, an attribute context;
  instructions to determine, for each of the candidate anchor attributes, a context similarity between each of the plurality of anchor attributes; and
  instructions to determine a new anchor attribute from the set of candidate anchor attributes based on the context similarity, wherein the new anchor attribute defines a new schema of records.

19. The computer-readable storage medium of claim 18, wherein the instructions to determine a set of filter attributes that are not mutually exclusive with any of the plurality of anchor attributes comprise:
  instructions to calculate a cooccurrence value between an attribute of the attribute-value pairs of the data set and an anchor attribute; and
  instructions to determine the cooccurrence value is greater than a predetermined threshold.

20. The computer-readable storage medium of claim 18, wherein the instructions to determine a new anchor attribute from the set of candidate anchor attributes based on the context similarity comprise instructions to select the new anchor attribute with a maximum context similarity.

* * * * *